US012556857B2

(12) United States Patent
Liu et al.

(10) Patent No.: US 12,556,857 B2
(45) Date of Patent: Feb. 17, 2026

(54) SPEAKER MODULE AND HEADSET

(71) Applicant: Beijing Honor Device Co., Ltd., Beijing (CN)

(72) Inventors: Jinhua Liu, Beijing (CN); Jianfei Chu, Beijing (CN); Yunhai Li, Beijing (CN); Chuanguo Wang, Beijing (CN)

(73) Assignee: BEIJING HONOR DEVICE CO., LTD., Beijing (CN)

( * ) Notice: Subject to any disclaimer, the term of this patent is extended or adjusted under 35 U.S.C. 154(b) by 286 days.

(21) Appl. No.: 18/272,934

(22) PCT Filed: Aug. 25, 2022

(86) PCT No.: PCT/CN2022/114786
§ 371 (c)(1),
(2) Date: Jul. 18, 2023

(87) PCT Pub. No.: WO2023/045692
PCT Pub. Date: Mar. 30, 2023

(65) Prior Publication Data

US 2024/0080610 A1 Mar. 7, 2024

(30) Foreign Application Priority Data

Sep. 22, 2021 (CN) .......................... 202111109352.7

(51) Int. Cl.
*H04R 9/06* (2006.01)
*H04R 1/10* (2006.01)
*H04R 1/24* (2006.01)

(52) U.S. Cl.
CPC ............. *H04R 1/24* (2013.01); *H04R 1/1016* (2013.01); *H04R 1/1075* (2013.01); *H04R 9/06* (2013.01)

(58) Field of Classification Search
CPC ...... H04R 1/24; H04R 1/1016; H04R 1/1075; H04R 9/06; H04R 9/02; H04R 11/02;
(Continued)

(56) References Cited

U.S. PATENT DOCUMENTS 9,654,860 B2 5/2017 Shin
2008/0049959 A1 2/2008 Yang
(Continued)

FOREIGN PATENT DOCUMENTS

CN 101137249 A 3/2008
CN 101998199 A 3/2011
(Continued)

OTHER PUBLICATIONS

Translation of WO 2109080789 A1. Mei et al. Vibrating Diaphragm Speaker and Earphone Capable of Producing Three Dimensional Stereo Sound Effects. (Year: 2019).*
(Continued)

*Primary Examiner* — Brian Ensey
(74) *Attorney, Agent, or Firm* — WOMBLE BOND DICKINSON (US) LLP

(57) ABSTRACT

A speaker module and a headset (100) are provided. The speaker module is used for the headset (100). The headset (100) includes a housing (1). The speaker module includes a first speaker unit (4*a*) and a second speaker unit (4*b*). An outer surface of a first diaphragm assembly (4*a*21) of the first speaker unit (4*a*) faces a first side, the second speaker unit (4*b*) is located on one side of a circumferential direction of the first speaker unit (4*a*), the second speaker unit (4*b*) emits sound toward the first side, and sound emission frequency of the second speaker unit (4*b*) is greater than sound emission frequency of the first speaker unit (4*a*).

20 Claims, 24 Drawing Sheets

(58) Field of Classification Search
CPC .. H04R 2307/207; H04R 7/20; H04R 1/1025; H04R 1/10; H04R 1/22
See application file for complete search history.

(56) References Cited

U.S. PATENT DOCUMENTS

| | | | |
|---|---|---|---|
| 2015/0055810 | A1 | 2/2015 | Shin |
| 2015/0304763 | A1 | 10/2015 | Wen et al. |

FOREIGN PATENT DOCUMENTS

| | | | |
|---|---|---|---|
| CN | 203167208 | U | 8/2013 |
| CN | 203968316 | U | 11/2014 |
| CN | 104469629 | A | 3/2015 |
| CN | 104811839 | A | 7/2015 |
| CN | 104954924 | A | 9/2015 |
| CN | 107046666 | A | 8/2017 |
| CN | 208094750 | U | 11/2018 |
| CN | 109309887 | A | 2/2019 |
| CN | 111182400 | A | 5/2020 |
| CN | 212305602 | U | 1/2021 |
| CN | 213342622 | U | 6/2021 |
| CN | 115002590 | A | 9/2022 |
| KR | 20060000239 | A | 1/2006 |
| WO | 2013147385 | A1 | 10/2013 |
| WO | 2016033911 | A1 | 3/2016 |

OTHER PUBLICATIONS

Translation of CM 101998199. Yang. “Earphones” (Year: 2011).*

* cited by examiner

SPEAKER MODULE AND HEADSET

CROSS-REFERENCE TO RELATED APPLICATIONS

This application is a national stage of International Application No. PCT/CN2022/114786 filed on Aug. 25, 2022, which claims priority to Chinese Patent Application No. 202111109352.7 filed on Sep. 22, 2021. The disclosures of both of the aforementioned application are hereby incorporated by reference in their entireties.

TECHNICAL FIELD

This application relates to the field of electronic product technologies, and in particular, to a speaker module and a headset.

BACKGROUND

In a use process of an electronic product, to enable a user to listen, without disturbing others, to sound information provided by the electronic product, a headset has become an essential accessory of the electronic product.

In a related technology, a structural layout of an internal speaker of the headset is improper, resulting in a poor sound output effect of the headset, and therefore needs to be further improved.

SUMMARY

Embodiments of this application provide a speaker module and a headset, to achieve a relatively good sound output effect.

To achieve the foregoing objective, the following technical solutions are used in the embodiments of this application:

According to a first aspect, some embodiments of this application provide a speaker module, used for a headset. The headset includes a housing. The speaker module includes a first speaker unit and a second speaker unit. The first speaker unit includes a first diaphragm assembly, an outer surface of the first diaphragm assembly faces a first side, the second speaker unit is located on one side of a circumferential direction of the first speaker unit, the second speaker unit emits sound toward the first side, and sound emission frequency of the second speaker unit is greater than sound emission frequency of the first speaker unit.

According to the headset in this embodiment of this application, the first speaker unit and the second speaker unit are disposed, and the sound emission frequency of the second speaker unit is greater than the sound emission frequency of the second speaker unit. This helps the headset have relatively good sound expressiveness in ranges of different frequencies by using a sound emission frequency difference between the first speaker unit and the second speaker unit, thereby improving a sound output effect of the speaker module. Furthermore, the second speaker unit is located on one side of the circumferential direction of the first speaker unit. In addition, a sound emission direction of the first speaker unit is the same as a sound emission direction of the second speaker unit. This can prevent the second speaker unit from blocking sound output of the first speaker unit, and can also prevent sound output vibration of the first speaker unit from interfering with the second speaker unit, thereby helping improve an overall sound output effect of the headset. In addition, this can also help improve comfort of a user in wearing the headset, and reduce a volume of the headset.

According to some optional embodiments of this application, an outer circumferential surface of the first speaker unit includes a first contour surface and a second contour surface, and the first contour surface and the second contour surface are arranged and connected along the circumferential direction of the first speaker unit. An inner circumferential surface of the housing includes a first inner circumferential surface region and a second inner circumferential surface region, and the first inner circumferential surface region and the second inner circumferential surface region are arranged and connected along a circumferential direction of the housing. The first contour surface is opposite to and spaced apart from the first inner circumferential surface region, the second contour surface is adapted to the second inner circumferential surface region, and the second speaker unit is located between the first contour surface and the first inner circumferential surface region. In this disposition, on one hand, the first contour surface is spaced apart from the first inner circumferential surface region, so that the second speaker unit can be avoided by using the first contour surface, to provide avoidance space for disposition of the second speaker unit, thereby facilitating disposition of the second speaker unit. On the other hand, the second contour surface is adapted to the second inner circumferential surface region, so that the second contour surface fits with the second inner circumferential surface region, to help set an overall volume of the first speaker unit to be larger on the basis that the first speaker unit provides the second speaker unit with the avoidance space, thereby ensuring an effective vibration area of the diaphragm assembly in the first speaker unit, and improving a sound output effect of the first speaker unit.

According to some optional embodiments of this application, the second inner circumferential surface region is a curved surface extending along the circumferential direction of the housing, and the second contour surface is a curved surface extending along the circumferential direction of the housing. This disposition helps increase a volume of accommodation space in the housing while ensuring that an overall shape of the housing is adapted to an ear of a human body, so that more functional devices are integrated into the headset.

According to some optional embodiments of this application, both the second inner circumferential surface region and the second contour surface are arc-shaped surfaces that extend along the circumferential direction of the housing and that are arched away from the first contour surface. This disposition helps increase a volume of accommodation space in the housing while ensuring that an overall shape of the housing is adapted to an ear of a human body, so that more functional devices are integrated into the headset.

According to some optional embodiments of this application, the first contour surface is a plane, or the first contour surface is an arc-shaped surface arched toward the first inner circumferential surface region. This helps avoid the second speaker unit.

According to some optional embodiments of this application, the first speaker unit includes a first frame, the first diaphragm assembly is supported on the first frame and disposed based on a same central axis as the first frame, a circumferential wall of the first frame includes a first part and a second part, the first part and the second part are arranged and connected along a circumferential direction of the first frame, a surface that is of the first part and that faces away from the second part is formed as the first contour surface, and a surface that is of the second part and that faces away from the first part is formed as the second contour surface. Therefore, the circumferential wall of the first frame includes the first part and the second part, the surface that is of the first part and that faces away from the second part is formed as the first contour surface, and the surface that is of the second part and that faces away from the first part is formed as the second contour surface, so that the first frame can be used as a casing of the first speaker unit without disposition of an additional casing. Furthermore, a front cavity and a rear cavity of the first speaker unit may be disposed in the housing of the headset, to help increase a volume of the first speaker unit, thereby increasing an effective vibration area of the first diaphragm assembly, and ensuring a sound output effect of the first speaker unit.

According to some optional embodiments of this application, the first diaphragm assembly has a first folded ring, the first folded ring includes a first segment and a second segment, the first segment and the second segment are arranged and connected in the circumferential direction of the first frame, an extending path of the first segment along the circumferential direction of the first frame is the same as an extending path of the first part along the circumferential direction of the first frame, an extending path of the second segment along the circumferential direction of the first frame is the same as an extending path of the second part along the circumferential direction of the first frame, the first segment is located between the first part and the second segment, and the second segment is located between the first segment and the second part. In this disposition, the first diaphragm assembly can be adapted to a shape of the circumferential wall of the first frame, to help improve connection reliability between the first diaphragm assembly and the first frame, and help set a size of the first diaphragm assembly to be larger, thereby ensuring an effective vibration area of the first diaphragm assembly, and improving a sound output effect of the first speaker unit.

According to some optional embodiments of this application, the first diaphragm assembly is symmetrically disposed. When a first voice coil drives the first diaphragm assembly to vibrate, this helps enable the first diaphragm assembly to receive driving forces of a same magnitude on two sides of a symmetry plane of the first diaphragm assembly, thereby helping prevent a rolling vibration phenomenon from occurring on the first diaphragm assembly in a direction perpendicular to the symmetry plane.

According to some optional embodiments of this application, the first segment is equal to the second segment in width. This helps implement piston-type vibration of the first diaphragm assembly, to avoid, to at least a specific degree, a problem that rolling vibration occurs on the first diaphragm assembly.

According to some optional embodiments of this application, the first diaphragm assembly is an integrally formed member. This disposition helps improve structural strength of the first diaphragm assembly, thereby facilitating processing and manufacturing of the first diaphragm assembly.

According to some optional embodiments of this application, an annular groove recessed in a direction away from the central axis of the first frame is disposed on an inner circumferential surface of the first frame, the annular groove extends along the circumferential direction of the first frame and the annular groove penetrates to an end surface of an open end of the first frame, an outer edge of the first diaphragm assembly is accommodated in the annular groove and fastened to a bottom surface of the annular groove. This helps effectively support the first diaphragm assembly by using the annular groove. In addition, due to disposition of the annular groove, a volume of space in the first frame can be increased, to help set a size of the first diaphragm assembly to be larger, thereby helping increase an effective vibration area of the first diaphragm assembly, and improve a sound output effect of the speaker.

According to some optional embodiments of this application, the first speaker unit includes the first voice coil, and the first voice coil is connected to an inner surface of the first diaphragm assembly. The first voice coil includes a first voice coil part and a second voice coil part that are arranged and connected in the circumferential direction of the first frame, an extending path of the first voice coil part along the circumferential direction of the first frame is the same as the extending path of the first part along the circumferential direction of the first frame, the first voice coil part is located between the first part and the second voice coil part, an extending path of the second voice coil part along the circumferential direction of the first frame is the same as the extending path of the second part along the circumferential direction of the first frame, and the second voice coil part is located between the second part and the first voice coil part. In this disposition, when the first voice coil pushes the first diaphragm assembly to vibrate, uniformity of a driving force of the first voice coil for the first diaphragm assembly in a circumferential direction can be improved to at least a specific degree, and a problem that polarization or rolling vibration occurs on the first diaphragm assembly because a shape of the first voice coil is not adapted to a shape of the first diaphragm assembly can be avoided to at least a specific degree.

According to some optional embodiments of this application, the first speaker unit includes a first magnetic circuit system, the first magnetic circuit system is fastened to the first frame, and the first magnetic circuit system has an annular magnetic gap. The magnetic gap includes a first gap part and a second gap part, the first gap part and the second gap part are arranged and connected in the circumferential direction of the first frame, the first gap part is adapted to the first voice coil part, and the second gap part is adapted to the second voice coil part. In this disposition, a shape of the entire magnetic gap can be adapted to a shape of the first voice coil, to help ensure cooperation reliability between the first voice coil and the first magnetic circuit system. Therefore, when the first voice coil cooperates with the first magnetic circuit system to drive the first diaphragm assembly to vibrate, uniformity of a driving force for the first diaphragm assembly in the circumferential direction of the first frame is ensured, and a problem that rolling vibration occurs on the first diaphragm assembly is avoided. In addition, the first voice coil is connected to a side that is of the first diaphragm assembly and that faces away from a sound output hole, and an end that is of the first voice coil and that is away from the first diaphragm assembly cooperates with the magnetic gap of the first magnetic circuit system. In this way, compared with a solution in which the first voice coil is connected to a side that is of a first dome and that faces the sound output hole, and the end that is of the first voice coil and that is away from the first diaphragm assembly cooperates with the magnetic gap of the first magnetic circuit system, an outer surface that is of the first diaphragm assembly and that faces the sound output hole is not blocked by the first magnetic circuit system or the first voice coil, to help ensure a sound output area of the first diaphragm assembly, and further improve a sound output effect of the first speaker unit.

According to some optional embodiments of this application, the first magnetic circuit system includes an edge magnetic part and a first central magnetic part. The edge magnetic part is annular, the edge magnetic part includes a first subpart and a second subpart, the first subpart and the second subpart are arranged and connected in the circumferential direction of the first frame, an extending path of the first subpart in the circumferential direction of the first frame is the same as the extending path of the first part in the circumferential direction of the first frame, and an extending path of the second subpart in the circumferential direction of the first frame is the same as the extending path of the second part in the circumferential direction of the first frame. The first central magnetic part is surrounded by the edge magnetic part, the first central magnetic part and the edge magnetic part define the magnetic gap, an outer circumferential surface of the first central magnetic part includes a first surface and a second surface, the first surface and the second surface are arranged and connected in the circumferential direction of the first frame, the first surface is opposite to and spaced apart from the first subpart to define the first gap part, and the second surface is opposite to and spaced apart from the second subpart to define the second gap part.

According to some optional embodiments of this application, both the edge magnetic part and the first central magnetic part may be magnetic bodies. Therefore, magnetic circuit intensity of the first magnetic circuit system can be improved.

According to some optional embodiments of this application, the first magnetic circuit system further includes a second central magnetic part, and the second central magnetic part blocks an end that is of the edge magnetic part and that is away from the first diaphragm assembly, to support the first central magnetic part.

According to some optional embodiments of this application, the second central magnetic part and the edge magnetic part may be an integrally formed member. In this way, connection strength between the second central magnetic part and the edge magnetic part is high, thereby helping reliable support of the second central magnetic part for the first central magnetic part.

According to some optional embodiments of this application, the second central magnetic part may be a magnetic conductive material member. In this way, leakage of a magnetic force line can be restricted by using the second central magnetic part, thereby increasing magnetic induction intensity of the first magnetic circuit system.

According to some optional embodiments of this application, the first magnetic circuit system further includes a magnetic conductive yoke, and the magnetic conductive yoke is disposed on a side that is of the first central magnetic part and that faces the first diaphragm assembly. Therefore, leakage of the magnetic force line is restricted by using the first magnetic circuit system, thereby improving driving strength for the first diaphragm assembly.

According to some optional embodiments of this application, an outer circumferential surface of the magnetic conductive yoke is flush with the outer circumferential surface of the first central magnetic part in an axial direction of the first magnetic circuit system. This helps further improve a restriction effect of the magnetic conductive yoke for the magnetic force line, and increase magnetic induction intensity of the first magnetic circuit system. Furthermore, the magnetic conductive yoke does not affect the magnetic gap, thereby helping improve adaption between the first magnetic circuit system and the first voice coil.

According to some optional embodiments of this application, a width of the first gap part is less than a width of the second gap part. This helps increase a driving force received on a side that is of the first diaphragm assembly and that is close to the first part, thereby improving uniformity of a driving force received by the first diaphragm assembly in the circumferential direction of the first frame, and avoiding a problem that rolling vibration occurs on the first diaphragm assembly.

According to some optional embodiments of this application, a surface that is of the second speaker unit and that faces away from the first speaker unit is adapted to the first inner circumferential surface region. This disposition helps make full use of space of the housing to implement compactness of a structure, and facilitates cooperation between the second speaker unit and the first speaker unit to separate the front cavity and the rear cavity of the first speaker unit.

According to some optional embodiments of this application, an outer circumferential contour of the first speaker unit is elliptical, and the second speaker unit is located at one end of a length direction of a short axis of the first speaker unit.

According to some optional embodiments of this application, the first speaker unit is a moving-coil woofer.

According to some optional embodiments of this application, the second speaker unit is a moving-iron tweeter or a planar voice coil tweeter.

According to some optional embodiments of this application, the second speaker unit includes a protective casing, a second diaphragm assembly, a spring plate, a transmission rod, a second magnetic circuit system, and a second voice coil. The second diaphragm assembly is disposed in the protective casing. The second diaphragm assembly is parallel to an axial direction of the first speaker unit to divide space in the protective casing into a front cavity and a rear cavity, and a sound output channel connected to the front cavity is formed on a side that is of the protective casing and that is adjacent to the sound output hole. The spring plate, the transmission rod, and the second magnetic circuit system are all disposed in the rear cavity, the second magnetic circuit system is coaxially disposed with the second voice coil, an axial direction of the second magnetic circuit system is the same as the axial direction of the first speaker unit, the second magnetic circuit system cooperates with the second voice coil to drive the spring plate to vibrate, and the transmission rod is connected to the spring plate and the second diaphragm assembly. Therefore, a simple structure and a small volume are achieved.

In some optional embodiments of this application, the front cavity and the rear cavity of the second speaker unit are arranged on a radial direction of the first speaker unit, and the front cavity is located on a side that is of the rear cavity and that is away from the first speaker unit. This disposition helps reduce sound output interference between the first speaker unit and the second speaker unit.

In some optional embodiments of this application, the spring plate includes a first plate body, a second plate body, and a connection plate body. Both the first plate body and the second plate body are disposed in parallel to the second diaphragm assembly, the second plate body is located on a side that is of the first plate body and that is away from the second diaphragm assembly, a support body beyond an edge of the first plate body is disposed at one end of the second plate body, the connection plate body is connected between an end that is of the second plate body and that is away from the support body and an end that is of the first plate body and that is away from the support body, and the support plate body is connected to the transmission rod. The second magnetic circuit system includes a magnetic conductive part and two magnetic body parts, the magnetic conductive part is annular, an axial direction of the magnetic conductive part is the same as the axial direction of the first speaker unit, and the first plate body is supported on a surface of a side that is of the magnetic conductive part and that is adjacent to the second diaphragm assembly. The two magnetic body parts are disposed in the magnetic conductive part and are oppositely disposed in a radial direction of the magnetic conductive part, and the second plate body penetrates from one end of the axial direction of the magnetic conductive part to the other end of the axial direction of the magnetic conductive part, so that the support body is located outside the magnetic conductive part, and the second plate body is located between the two magnetic body parts.

According to a second aspect, an embodiment of this application provides a headset. The headset includes a housing and the speaker module in the foregoing embodiment. A sound output hole is formed on the housing, the first speaker unit is disposed in the housing, the outer surface of the first diaphragm assembly faces the sound output hole, the second speaker unit is disposed in the housing, and the second speaker unit emits sound toward the sound output hole.

Because the headset provided in this embodiment of this application includes the speaker module according to any one of the foregoing technical solutions, the headset and the speaker module can resolve a same technical problem and achieve a same technical effect.

REFERENCE NUMERALS

Figure 1:
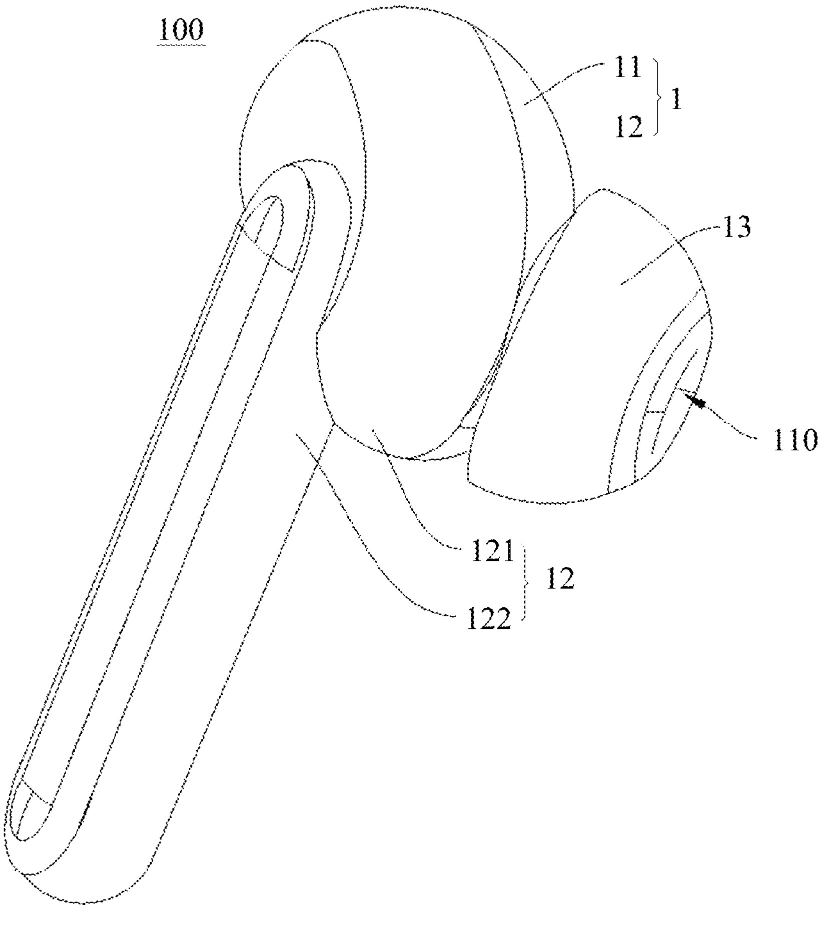
FIG. 1 is a schematic diagram of a structure of a headset according to some embodiments of this application.

- 100: Headset;
- 1: Housing; 10: Accommodation space; **10*a*: First inner circumferential surface region; 10*b*: Second inner circumferential surface region; 101: First accommodation cavity; 11: Front housing; 110: Sound output hole; 111: Main body part; 12: Extending part; 1121: Limiting convex rib; 12: Rear housing; 102: Second accommodation cavity; 121: Shield body; 122: Rod body; and 13**: Contact sleeve;
- 2: Main board;
- 3: Battery;
- 4: Speaker; 42: Core; 421: Diaphragm; 422: Voice coil; 423: Magnetic circuit system; and 424: Frame;
- **4*a*: First speaker unit; 4*aa*: First contour surface; 4*ab*: Second contour surface; 4*a*21: First diaphragm assembly; 4*a*211: First connection part; 4*a*2111: First connection segment; 4*a*2112: Second connection segment; 4*a*212: First folded ring; 4*a*2121: First segment; 4*a*2122: Second segment; 4*a*213: First dome; 4*a*22: First voice coil; 4*a*221: First voice coil part; 4*a*222: Second voice coil part; 4*a*23: First magnetic circuit system; 4*a*23*a*: Magnetic gap; 4*a*23*a*1: First gap part; 4*a*23*a*2: Second gap part; 4*a*231: Edge magnetic part; 4*a*231*a*: First subpart; 4*a*231*b*: Second subpart; 4*a*232: First central magnetic part; 4*a*232*a*: First surface; 4*a*232*b*: Second surface; 4*a*233: Second central magnetic part; 4*a*234: Magnetic conductive yoke; 4*a*24**:

First frame; 4*a*241: Circumferential wall; 4*a*2411: First part; 4*a*2412: Second part; 4*a*2413: Annular groove; 4*a*242: Bottom wall; 4*a*243: Annular flange; and 4*a*24*a*: Installation through hole;

4*b*: Second speaker unit; 4*b*1: Protective casing; 4*b*1*a*: First casing part; 4*b*1*b*: Second casing part; 4*b*11: Second sound output hole; 4*b*21: Second diaphragm assembly; 4*b*21*a*: Second connection part; 4*b*21*b*: Second folded ring; 4*b*21*c*: Second dome; 4*b*22: Spring plate; 4*b*221: First plate body; 4*b*222: Second plate body; 4*b*223: Connection plate body; 4*b*224: Support body; 4*b*23: Transmission rod; 4*b*24: Second magnetic circuit system; 4*b*241: Magnetic conductive part; 4*b*242: Magnetic body part; and 4*b*25: Second voice coil;

5: Wireless charging module; 51: Power receiving coil; 52: Alternating current-to-direct current conversion module; 53: Charging control module; and 6: Wireless communication module; and

200: Wireless charging base; 201: Charging coil; 202: Direct current-to-alternating current conversion module; and 203: Power interface.

DESCRIPTION OF EMBODIMENTS

In embodiments of this application, the terms "first", "second", and "third" are used for descriptive purposes only, and cannot be construed as indicating or implying relative importance or implicitly indicating a quantity of indicated technical features. Therefore, a feature defined by "first", "second", or "third" may explicitly or implicitly include one or more such features.

In the descriptions of the embodiments of this application, it should be noted that unless otherwise specified and defined explicitly, the terms "install", "connect", and "connection" should be understood in a broad sense. For example, "connection" may be a detachable connection or a non-detachable connection; or may be a direct connection or an indirect connection through an intermediate medium. Orientation terms such as "front", "rear", "inside", and "outside" mentioned in the embodiments of this application merely refer to directions in the accompanying drawings. Therefore, the used orientation terms are intended for better and clearer description and understanding of the embodiments of this application, and are not intended for indicating or implying that an indicated apparatus or element needs to have a specific orientation or constructed and operated in a specific orientation, and therefore shall not be construed as limitations on the embodiments of this application. The term "a plurality of" means at least two.

In the embodiments of this application, the term "include", "comprise", or any other variant thereof is intended to cover non-exclusive inclusion, so that a process, method, article, or apparatus that includes a series of elements includes not only those elements but also other elements that are not explicitly listed, or includes elements inherent to such a process, method, article, or apparatus. Without further limitation, the element defined by the sentence "including a . . . " does not exclude that other identical elements also exist in the process, method, article, or apparatus including the element. Without further limitation, the element defined by the sentence "including a . . . " does not exclude that other identical elements also exist in the process, method, article, or apparatus including the element.

In the embodiments of this application, the term "and/or" is only used to describe an association relationship between associated objects, and indicates that three relationships may exist. For example, A and/or B may indicate the following three cases: Only A exists, both A and B exist, and only B exists. In addition, the character "/" in this specification generally indicates an "or" relationship between associated objects.

In the embodiments of this application, the qualifiers, such as "parallel", "perpendicular", "same direction", "coaxial", "same axis", and "parallel", used to describe orientation relationships between various components all indicate approximate orientations for which specific errors are allowed.

This application provides a headset 100. The headset can be used in cooperation with an electronic product such as a mobile phone, a tablet computer, or a notebook computer, to receive sound information provided by the electronic product and output the sound information to a user. The headset 100 is used in cooperation with the electronic product, so that sound of the electronic product can be prevented from being played through a speaker to disturb others. The headset may be a wireless headset, or may be a wired headset.

Figure 2:
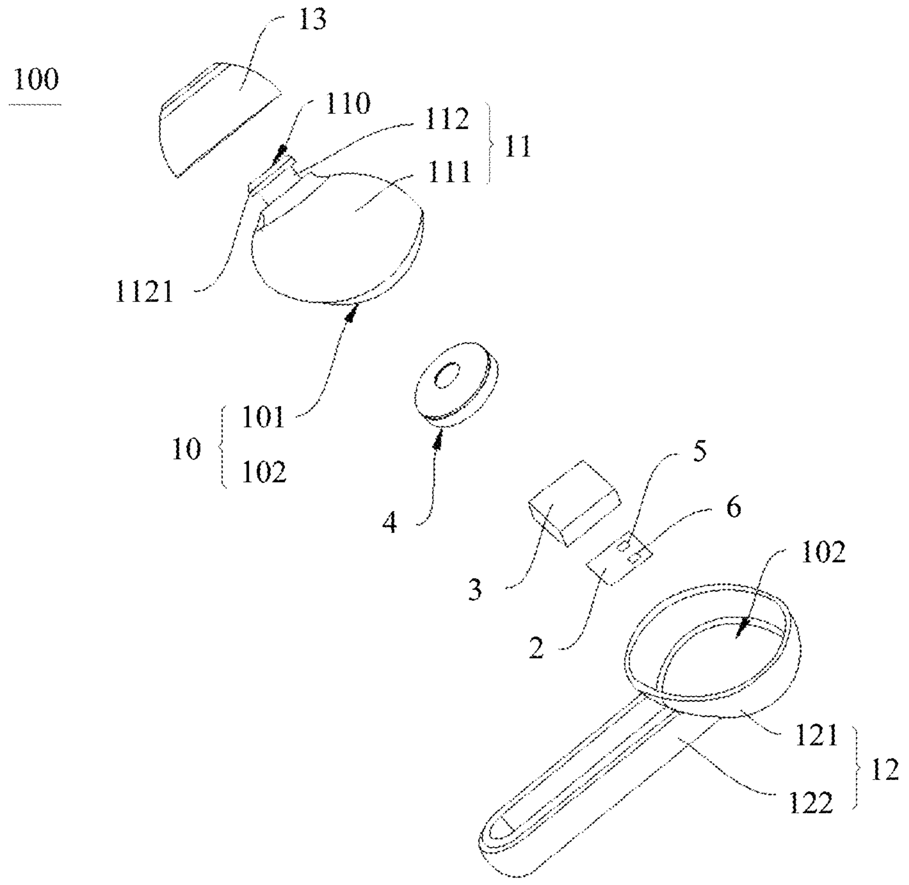
FIG. 2 is a schematic diagram of an exploded structure of the headset shown in FIG. 1.

Refer to FIG. 1 and FIG. 2. FIG. 1 is a schematic diagram of a structure of the headset 100 according to some embodiments of this application. FIG. 2 is a schematic diagram of an exploded structure of the headset 100 shown in FIG. 1. The headset 100 shown in FIG. 1 and FIG. 2 is described by using a wireless headset as an example. In this embodiment, the headset 100 may include a housing 1, a main board 2, a battery 3, a wireless charging module 5, a wireless communication module 6, and a speaker 4.

It may be understood that FIG. 1, FIG. 2, and the following related accompanying drawings merely show examples of some components included in the headset 100. Actual shapes, actual sizes, actual positions, and actual structures of these components are not limited by FIG. 1, FIG. 2, and the following accompanying drawings. In addition, when the headset 100 is a wired headset, the wired headset may include no battery, wireless communication module, or wireless charging module.

The housing 1 may be used as a carrier of functional devices of the headset 100, and configured to protect functional devices located in accommodation space 10 in the housing 1. In addition, when a user wears the headset 100, the headset 100 is in contact with an ear of the user through the housing 1. Therefore, to improve comfort of a user in wearing the headset 100, a shape of the housing 1 may be adapted to a shape of an ear of a human body.

The housing 1 is directly exposed to an external environment, to be in contact with an ear of a human body of a user. Alternatively, the headset 100 is in contact with another external structure through the housing 1. This inevitably causes a problem that an outer surface of the housing 1 is scratched, corroded, or the like. To avoid this technical problem, the housing 1 may have specific properties such as abrasion resistance, corrosion resistance, and scratch resistance, or the outer surface of the housing 1 is coated with a layer of a functional material used for abrasion resistance, corrosion resistance, and scratch resistance.

An inner circumferential surface of the housing 1 is a curved surface extending along a circumferential direction of the housing 1. In some examples, the inner circumferential surface of the housing 1 is an arc-shaped surface extending along the circumferential direction of the housing 1. For another example, the inner circumferential surface of the housing 1 is an elliptical arc-shaped surface extending along the circumferential direction of the housing 1. In another example, the inner circumferential surface of the housing 1 may be a combination of an arc-shaped surface and an elliptical arc-shaped surface, provided that it is ensured that the inner circumferential surface of the housing 1 is a curved surface. This disposition helps increase a volume of the accommodation space 10 in the housing 1 while ensuring that an overall shape of the housing 1 is adapted to an ear of a human body, so that more functional devices are integrated into the headset 100.

In some embodiments, the housing 1 may be used as an integral structure, that is, the housing 1 may be an integrally formed member, and the integrally formed housing 1 has higher structural strength.

In some other embodiments, the housing 1 may be formed by assembling a plurality of parts. Still referring to FIG. 1 and FIG. 2, in this embodiment, the housing 1 may include a front housing 11 and a rear housing 12. The front housing 11 faces a human ear when the headset 100 is used, and the rear housing 12 faces away from the human ear when the headset 100 is used. The housing 1 is formed by assembling the front housing 11 and the rear housing 12. This can facilitate separate processing of the front housing 11 and the rear housing 12, to help simplify mold structures of the front housing 11 and the rear housing 12, thereby reducing forming difficulty of the front housing 11 and the rear housing 12, and reducing processing and manufacturing difficulty of the housing 1. Specifically, the front housing 11 may be connected to the rear housing 12 through fastening in a buckling manner, or the front housing 11 may be connected to the rear housing 12 through a screw. Alternatively, in another implementation, the front housing 11 may be connected to the rear housing 12 through fastening by using glue or adhesive tape.

A material of the front housing 11 includes but is not limited to hard plastic, metal, and a combination of plastic and metal. To achieve a lightweight headset 100, hard plastic may be selected as the material of the front housing 11.

Referring to FIG. 2, a first accommodation cavity 101 is formed in the front housing 11, and a side that is of the first accommodation cavity 101 and that is adjacent to the rear housing 12 is open. A sound output hole 110 connected to the first accommodation cavity 101 is formed on the front housing 11, and sound of the headset 100 can be conducted to the outside of the headset 100 through the sound output hole 110.

Specifically, the front housing 11 may include a main body part 111 and an extending part 112. The extending part 112 may be located on one side of the main body part 111 and extend in a direction away from the main body part 111. Referring to FIG. 2, the first accommodation cavity 101 may be formed in the main body part 111, and the sound output hole 110 may be formed in the extending part 112. It may be understood that in some other embodiments, the front housing 11 may not include the extending part 112, and the sound output hole 110 is directly disposed on a wall surface of the main body part 111.

To improve comfort of a user in wearing the headset 100, a contact sleeve 13 may be further disposed on the headset 100, and the contact sleeve 13 may be configured to be in contact with an ear of the user. For example, the contact sleeve 13 may be disposed around an outer circumferential surface of the extending part 112, and a shape of the contact sleeve 13 may be similar to a shape of an ear canal of a human body, to improve adaption in wearing the headset 100. In addition, the contact sleeve 13 may be made of a flexible material such as silicone rubber or rubber, to improve comfort of a user in wearing the headset 100.

Referring to FIG. 2, a limiting convex rib 1121 may be formed on the outer circumferential surface of the extending part 112, so that when the contact sleeve 13 is disposed around the outer circumferential surface of the extending part 112, the limiting convex rib 1121 can press against the contact sleeve 13, thereby limiting the contact sleeve 13, and reducing a probability that the contact sleeve 13 naturally falls off from the extending part 112. Certainly, to reduce costs, the headset 100 may alternatively not include the contact sleeve 13.

A material of the rear housing 12 may be the same as the material of the front housing 11. Certainly, the material of the rear housing 12 may alternatively be different from the material of the front housing 11. To achieve a lightweight headset 100, hard plastic may be selected as the material of the rear housing 12.

Still referring to FIG. 2, the rear housing 12 may include a shield body 121 and a rod body 122. The shield body 121 may be connected to the front housing 11, and the rod body 122 may be disposed on a side that is of the shield body 121 and that is away from the front housing 11. A second accommodation cavity 102 may be formed in the shield body 121, and a side that is of the second accommodation cavity 102 and that is adjacent to the front housing 11 is open. In this way, the second accommodation cavity 102 can be connected to the first accommodation cavity 101, and the second accommodation cavity 102 and the first accommodation cavity 101 can jointly form the accommodation space 10 in the housing 1.

The shield body 121 and the rod body 122 may be an integral structure, that is, the shield body 121 and the rod body 122 are an integral structure. This can simplify processing and manufacturing techniques of the rear housing 12, and also improve connection strength between the shield body 121 and the rod body 122. Certainly, this application is not limited thereto. The shield body 121 and the rod body 122 may alternatively be formed through assembling, and the shield body 121 and the rod body 122 are connected through gluing, clamping, screwing, welding, or the like.

The main board 2 may be accommodated in the accommodation space 10. Specifically, the main board 2 may be installed in the second accommodation cavity 102. A manner of installing the main board 2 in the housing 1 includes but is not limited to clamping, screwing, or gluing.

The main board 2 is configured to integrate a control chip and the like. The control chip may be, for example, an application processor (application processor, AP), a double data rate (double data rate, DDR) synchronous dynamic random access memory, or a universal flash storage (universal flash storage, UFS). The main board 2 is electrically connected to functional devices such as the wireless communication module 6, the wireless charging module 5, the battery 3, and the speaker 4, to implement operations such as signal control and data signal processing between different functional devices.

The main board 2 may be a rigid printed circuit board, a flexible printed circuit board, or a rigid-flexible printed circuit board. The main board 2 may be an FR-dielectric plate, a Rogers (Rogers) dielectric plate, an FR- and Rogers mixed dielectric plate, or the like. Here, FR- is a code name of a level of a flame-resistant material, and the Rogers dielectric plate is a high-frequency plate.

The wireless communication module 6 may be integrated to the main board 2. For example, the wireless communication module 6 may be fastened to the main board 2 through welding. Optionally, the wireless communication module 6 may be a Bluetooth module, an infrared module, or a wife module. The headset 100 may exchange a wireless signal with an electronic product by using the wireless communication module 6, to receive sound information of the electronic product.

The battery 3 is configured to supply power to functional devices such as the main board 2, the wireless communication module 6, and the speaker 4 in the headset 100. The battery 3 may include but is not limited to a nickel-cadmium battery 3, a nickel-metal hydride battery 3, a lithium battery 3, or other types of batteries. In addition, there may be one or more batteries 3 in this embodiment of this application.

A shape of the battery 3 includes but is not limited to a cuboid, a cylinder, a frustum of a cone, or the like. In some examples, the battery 3 may be located in the second accommodation cavity 102, and the battery 3 is located on a side that is of the main board 2 and that is close to the first accommodation cavity 101. In another example, the battery 3 may be located on a side that is of the main board 2 and that faces away from the first accommodation cavity 101. A manner of installing the battery 3 in the housing 1 includes but is not limited to clamping, screwing, or gluing.

Figure 3:
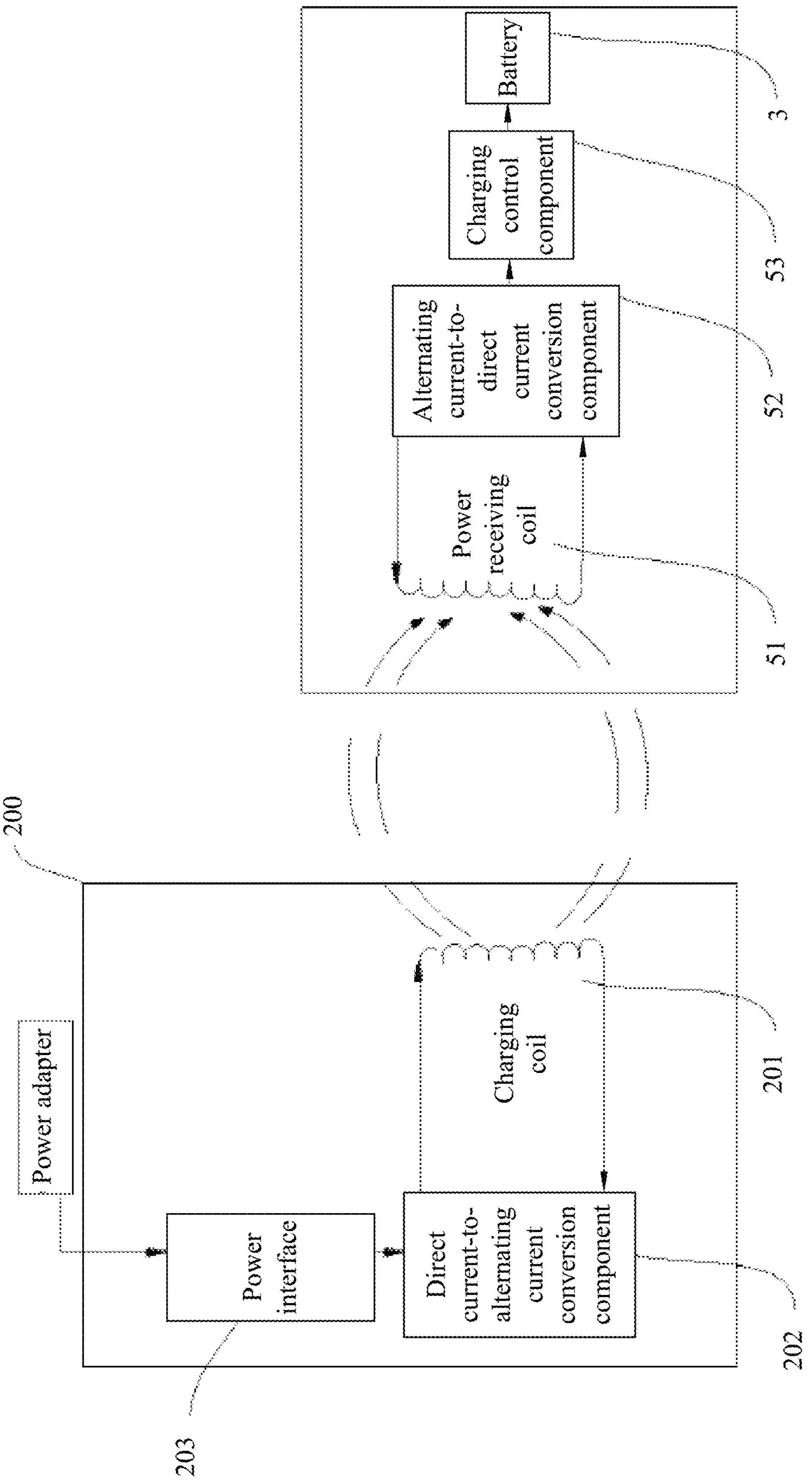
FIG. 3 is a schematic diagram of charging connection between the headset shown in FIG. 1-FIG. 2 and a wireless charging base.

The wireless charging module 5 may wirelessly charge the battery 3 of the headset 100. The wireless charging module 5 may be integrated to the main board 2. Specifically, refer to FIG. 3. FIG. 3 is a schematic diagram of charging connection between the headset 100 shown in FIG. 1-FIG. 2 and a wireless charging base 200. In this embodiment, the wireless charging module 5 includes a power receiving coil 51, an alternating current-to-direct current conversion component 52, and a charging control component 53. The power receiving coil 51, the alternating current-to-direct current conversion component 52, and the charging control component 53 are all electrically connected to the main board 2.

The power receiving coil 51 may receive wireless charging input of the wireless charging base 200 of the headset 100. Certainly, this application is not limited thereto. The power receiving coil 51 may alternatively receive wireless charging input of another terminal supporting wireless charging. The power receiving coil 51 is a receive (Rx) coil. The alternating current-to-direct current conversion component 52 may be an Rx chip.

The wireless charging base 200 includes a power interface 203, a charging coil 201, and a direct current-to-alternating current conversion component 202. The charging coil 201 may be a transmit (Tx) coil. The direct current-to-alternating current conversion component 202 may be a TX chip.

In this embodiment of this application, the wireless charging base 200 is used as a transmit end of a wireless charging signal, the headset 100 is used as a receive end of the wireless charging signal, and the wireless charging base 200 wirelessly charges the headset 100. Specifically, the direct current-to-alternating current conversion component 202 of the wireless charging base 200 may receive a direct current signal that is input by the power interface 203. The direct current-to-alternating current conversion component 202 may convert the direct current signal into an alternating current signal, and then input the alternating current signal to the charging coil 201. The charging coil 201 may generate an alternating electromagnetic field in response to the alternating current signal.

The power receiving coil 51 of the headset 100 is coupled to the charging coil 201. The power receiving coil 51 (namely, the Rx coil) induces the alternating electromagnetic field emitted by the charging coil 201 (namely, the Tx coil) to generate an alternating current signal, and inputs the alternating current signal to the alternating current-to-direct current conversion component 52. The alternating current-to-direct current conversion component 52 may rectify the alternating current signal into a direct current signal, and input the direct current signal to the charging control component 53. The charging control component 53 may charge the battery 3 based on the direct current signal.

Certainly, this application is not limited thereto. In some other examples, the headset 100 can also support wired charging. Specifically, a charging interface is disposed on the housing 1, the charging interface is electrically connected to the main board 2, and the charging interface may be connected to a wired charger (also referred to as a power adapter) to receive charging input provided by the wired charger for the battery 3. For example, the charging interface may be a universal serial bus (universal serial bus, USB) interface.

The speaker 4 may be installed in the accommodation space 10, and the speaker 4 is located on a side that is of the battery 2 and that is close to the sound output hole 110. Specifically, the speaker 4 may be installed in the first accommodation cavity 101. An assembling manner between the speaker 4 and the housing 1 includes but is not limited to clamping, threading, gluing, or the like. The speaker 4 is electrically connected to the main board 2 to obtain an audio electrical signal such as music or voice, and the speaker 4 can convert the audio electrical signal into a sound signal, and support audio play.

Figure 4:
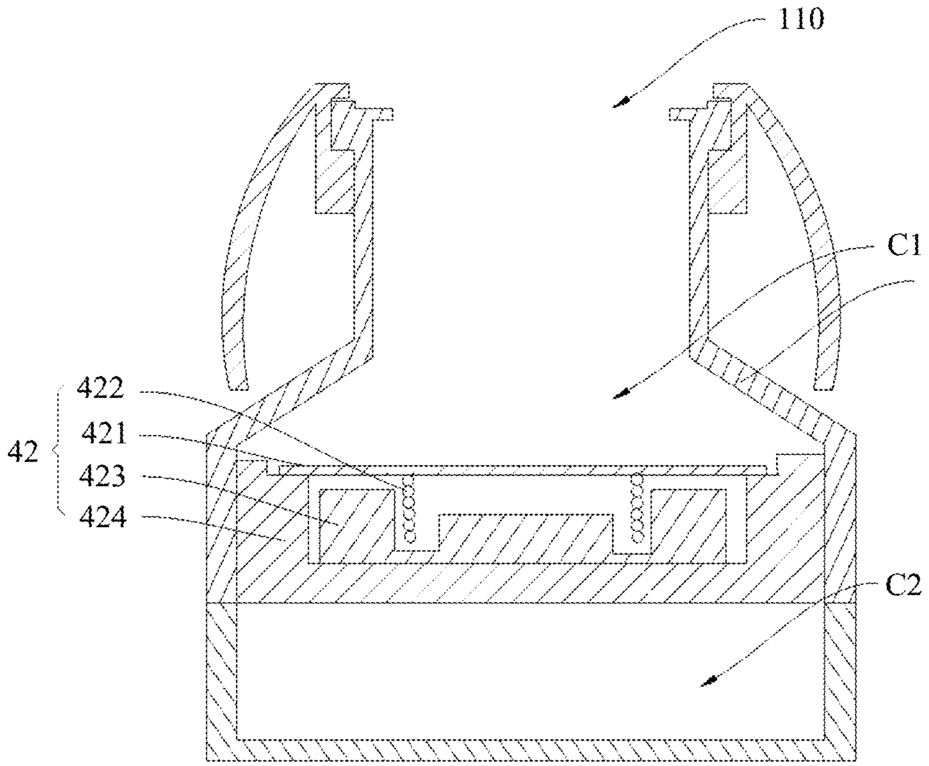
FIG. 4 is a cross-sectional view of a partial structure of the headset shown in FIG. 1-FIG. 2.

Refer to FIG. 4. FIG. 4 is a cross-sectional view of a partial structure of the headset 100 shown in FIG. 1-FIG. 2. In this embodiment, the speaker 4 is a core 42. The core 42 includes a diaphragm assembly 421, a voice coil 422 connected to the diaphragm assembly 421 through fastening, a magnetic circuit system 423 disposed on one side of the diaphragm assembly 421, and a frame 424 used to install the diaphragm assembly 421 and the magnetic circuit system 423.

The speaker 4 is fastened in the housing 1 by using the frame 424, and an assembling manner between the frame 424 and the housing 1 includes but is not limited to clamping, threading, gluing, or the like. In addition, the speaker 4 may divide the housing 1 into a front cavity C1 and a rear cavity C2 by using the diaphragm assembly 421. The voice coil 422, the magnetic circuit system 423, and the frame 424 are located in the rear cavity C2. The sound output hole 110 is connected to the front cavity C1. The voice coil 422 generates an induced magnetic field after being energized, and is displaced under the action of a magnetic force of the magnetic circuit system 423, to drive the diaphragm assembly 421 to vibrate, thereby pushing air in the front cavity C1 to vibrate to form a sound wave. The sound wave is output by the sound output hole 110.

Certainly, this application is not limited thereto. In some other examples, the speaker 4 may further include a casing. The speaker 4 is fastened in the housing 1 by using the casing. The core 42 may be fastened to an inner wall of the casing by using the frame 424. The speaker 4 may divide the casing into a front cavity and a rear cavity by using the diaphragm assembly 421, and the front cavity of the casing is connected to the sound output hole 110.

In the foregoing embodiment, the speaker 4 used in the headset 100 is a moving-coil woofer, and there is one speaker 4. This enables the headset 100 to have expressiveness in a low-frequency range, and makes manufacturing costs of the headset 100 low. However, the moving-coil woofer has a large vibration mass and a poor transient feature, and mass distribution, diaphragm compliance, and asymmetric distribution of a BL electromagnetic driving force may cause different degrees of rocking vibration and different frequencies of split vibration. As a result, a high-frequency response causes a serious peak and valley, and expressiveness in a high-frequency range cannot be implemented. Consequently, a property of the headset 100 in playing audio through the speaker is relatively poor, and a sound effect is poor.

Figure 5:
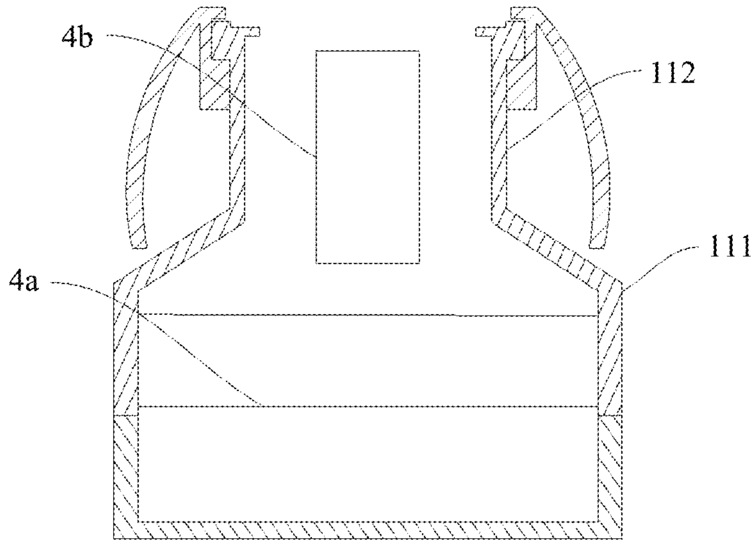
FIG. 5 is a cross-sectional view of a headset according to some other embodiments of this application.

To resolve this technical problem, refer to FIG. 5. FIG. 5 is a cross-sectional view of the headset 100 according to some other embodiments of this application. In this embodiment, instead of disposing one speaker in the headset 100, a plurality of different speakers are integrated to the headset 100. Specifically, the headset 100 may include a speaker module, and the speaker module includes a first speaker unit 4*a* and a second speaker unit 4*b*.

Both the first speaker unit 4*a* and the second speaker unit 4*b* may be disposed in the housing 1, and an outer surface of a diaphragm assembly in the first speaker unit 4*a* faces the sound output hole 110, so that the first speaker unit 4*a* can emit sound toward the sound output hole 110. In addition, the second speaker unit 4*b* also emits sound toward the sound output hole 110. Therefore, a sound emission direction of the first speaker unit 4*a* is the same as a sound emission direction of the second speaker unit 4*b*. Furthermore, sound emission frequency of the second speaker unit 4*b* is greater than sound emission frequency of the first speaker unit 4*a*. Therefore, the headset 100 includes the first speaker unit 4*a* and the second speaker unit 4*b*. This helps the headset 100 have relatively good sound expressiveness in ranges of different frequencies by using a sound emission frequency difference between the first speaker unit 4*a* and the second speaker unit 4*b*, thereby improving a sound output effect of the speaker module.

It should be explained that the "outer surface" of the diaphragm assembly in the first speaker unit 4*a* is a surface that is of the diaphragm assembly in the first speaker unit 4*a* and that faces away from the inside of the first speaker unit 4*a*, and a surface that is of the diaphragm assembly and that is opposite to the "outer surface" is an "inner surface".

Specifically, in this embodiment, the first speaker unit 4*a* may be used as a woofer, and the first speaker unit 4*a* may have a same structure as the speaker 4. For example, the first speaker unit 4*a* may be a moving-coil woofer. The second speaker unit 4*b* may be a tweeter. For example, the second speaker unit 4*b* may be a moving-iron tweeter or a planar voice coil tweeter.

In this embodiment of this application, the first speaker unit 4*a* is used as a woofer, and the second speaker unit 4*b* is used as a tweeter, so that the headset 100 can have expressiveness in both a low-frequency range and a high-frequency range, thereby improving a sound output effect of the speaker module.

Still referring to FIG. 5, the second speaker unit 4*b* and the first speaker unit 4*a* are arranged and spaced apart in a sound output direction of the sound output hole 110. Specifically, the first speaker unit 4*a* is located in the main body part 111, and the second speaker unit 4*b* is located in the extending part 112. In this embodiment, to facilitate placement of the second speaker unit 4*b*, a size of the extending part 112 needs to be designed to be relatively large. However, because the extending part 112 needs to cooperate with a human ear when the headset 100 is worn, an oversized extending part 112 causes a relatively large overall size of the housing 1 of the headset 100, and is also likely to bring uncomfortable wearing experience to a user. In addition, the second speaker unit 4*b* occupies space of the extending part 112, and consequently sound emission of the first speaker unit 4*a* is blocked, affecting a sound output effect of the first speaker unit 4*a*. In addition, because sound transmission is implemented through air vibration, sound output vibration of the first speaker unit 4*a* inevitably interferes with vibration of a diaphragm assembly in the second speaker unit 4*b*, affecting sound output of the second speaker unit 4*b*. As a result, an overall sound output effect of the headset 100 deteriorates.

The problem that the second speaker unit 4*b* and the first speaker unit 4*a* are spaced apart in the sound output direction of the sound output hole 110 and consequently a size of the extending part 112 is large can be resolved by disposing, in a magnetic circuit system of the first speaker unit 4*a*, a groove for accommodating the second speaker unit 4*b*. However, this disposition manner still cannot resolve the problem that the second speaker unit 4*b* blocks sound emission of the first speaker unit 4*a* and sound output vibration of the first speaker unit 4*a* interferes with vibration of the diaphragm assembly in the second speaker unit 4*b*.

Figure 6:
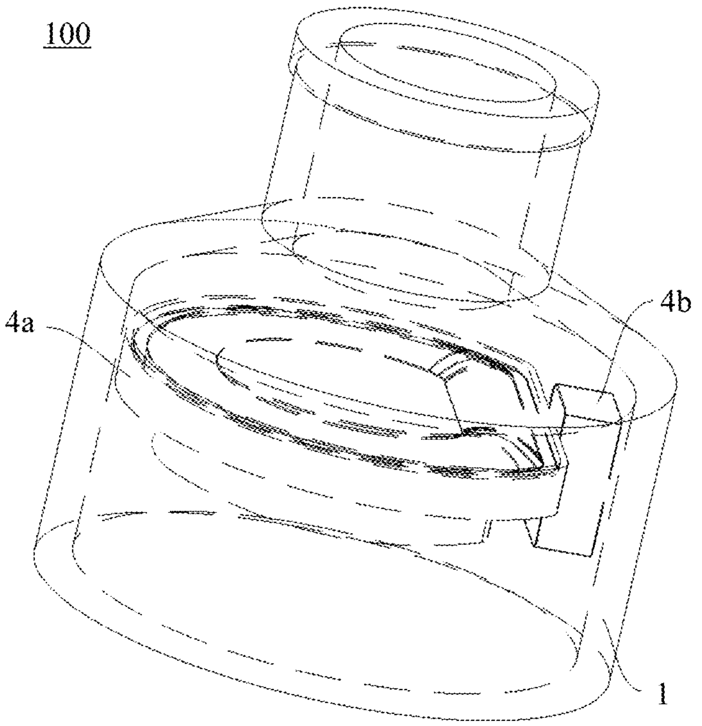
FIG. 6 is a schematic diagram of a headset according to still some other embodiments of this application.
Figure 7:
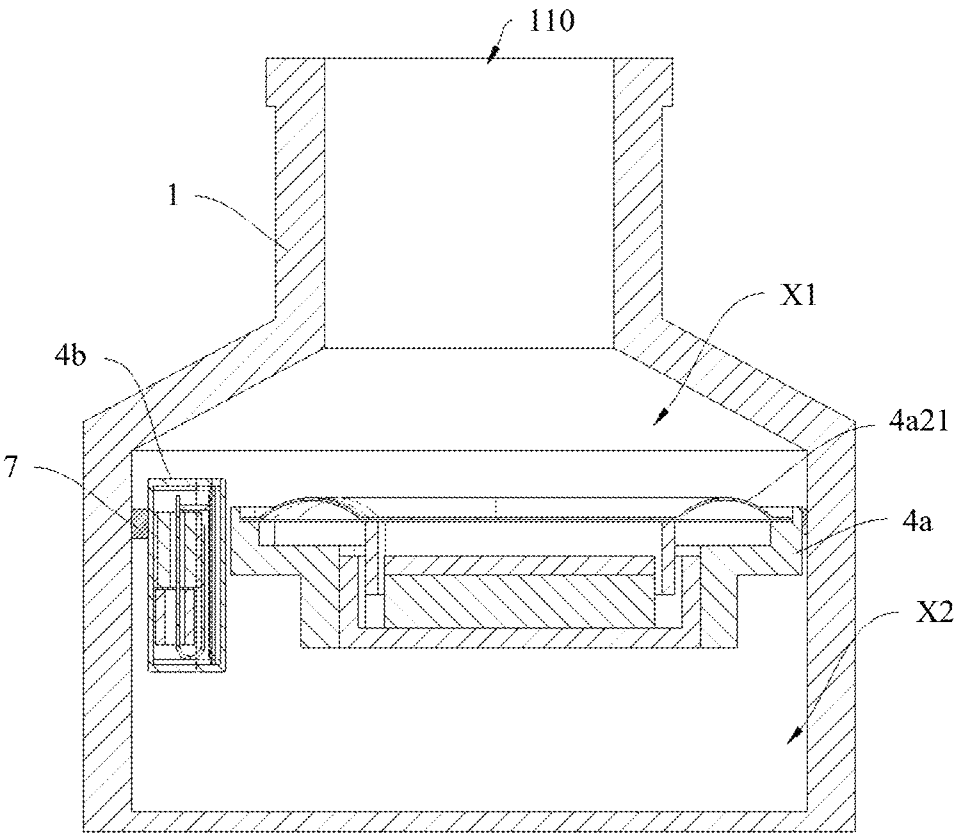
FIG. 7 is a schematic diagram of a structure of a cross section of the headset shown in FIG. 6.
Figure 8:
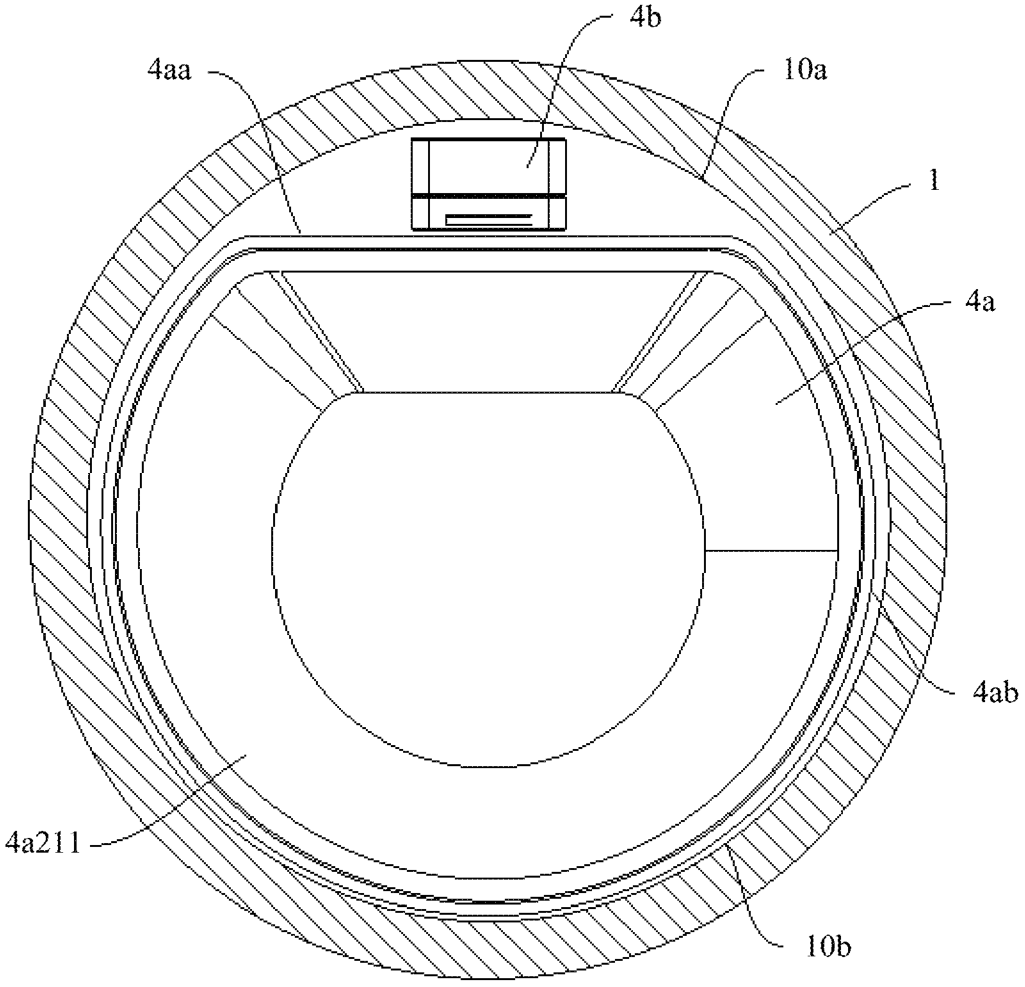
FIG. 8 is a schematic diagram of a structure of a cross section of the headset shown in FIG. 6.

Therefore, to resolve the foregoing technical problem, refer to FIG. 6, FIG. 7, and FIG. 8. FIG. 6 is a schematic diagram of the headset 100 according to still some other embodiments of this application. FIG. 7 is a schematic diagram of a structure of a cross section of the headset 100 shown in FIG. 6. FIG. 8 is a schematic diagram of a structure of a cross section of the headset 100 shown in FIG. 6. In this embodiment, in terms of an arrangement manner, the first speaker unit 4*a* and the second speaker unit 4*b* are no longer arranged along the sound output direction of the sound output hole 110. Instead, the first speaker unit 4*a* and the second speaker unit 4*b* are arranged side by side, and the second speaker unit 4*b* is located on one side of a circumferential direction of the first speaker unit 4*a*.

This can prevent the second speaker unit 4*b* from blocking sound output of the first speaker unit 4*a*, and can also prevent sound output vibration of the first speaker unit 4*a* from interfering with the second speaker unit 4*b*, thereby helping improve an overall sound output effect of the headset 100. Furthermore, this can also avoid the problem that the first speaker unit 4*a* is disposed in the main body part 111 and the second speaker unit 4*b* is disposed in the extending part 112 and consequently a volume of the extending part 112 is large, affecting experience of a user in wearing the headset 100, thereby helping improve comfort of the user in wearing the headset 100, and reducing a volume of the headset 100.

According to the headset 100 in this embodiment of this application, the first speaker unit 4*a* and the second speaker unit 4*b* are disposed, and the sound emission frequency of the second speaker unit 4*b* is greater than the sound emission frequency of the first speaker unit 4*a*. This helps the headset 100 have relatively good sound expressiveness in ranges of different frequencies by using a sound emission frequency difference between the first speaker unit 4*a* and the second speaker unit 4*b*, thereby improving a sound output effect of the speaker 4. Furthermore, the second speaker unit 4*b* is located on one side of the circumferential direction of the first speaker unit 4*a*, and both the first speaker unit 4*a* and the second speaker unit 4*b* emit sound toward the sound output hole 110. This can prevent the second speaker unit 4*b* from blocking sound output of the first speaker unit 4*a*, and can also prevent sound output vibration of the first speaker unit 4*a* from interfering with the second speaker unit 4*b*, thereby helping improve an overall sound output effect of the headset 100. Furthermore, this can also improve comfort of the user in wearing the headset 100, and reduce a volume of the headset 100.

Figure 9A:
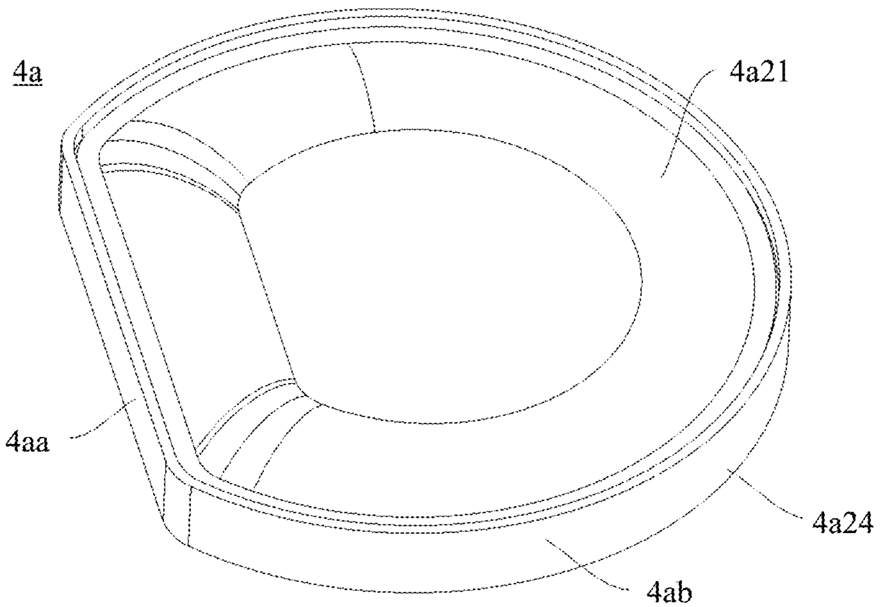
FIG. 9A is a schematic diagram of a structure of a first speaker unit in the headset shown in FIG. 6-FIG. 8.

Still refer to FIG. 8, and refer to FIG. 9A. FIG. 9A is a schematic diagram of a structure of the first speaker unit 4*a* in the headset 100 shown in FIG. 6-FIG. 8. In this embodiment, the inner circumferential surface of the housing 1 includes a first inner circumferential surface region 10*a* and a second inner circumferential surface region 10*b*, and the first inner circumferential surface region 10*a* and the second inner circumferential surface region 10*b* are arranged and connected along the circumferential direction of the housing 1.

Still referring to FIG. 8 and FIG. 9A, an outer circumferential surface of the first speaker unit 4*a* includes a first contour surface 4*aa* and a second contour surface 4*ab*. The first contour surface 4*aa* and the second contour surface 4*ab* are arranged and connected in the circumferential direction of the first speaker unit 4*a*.

The first contour surface 4*aa* is opposite to and spaced apart from the first inner circumferential surface region 10*a*, and the second speaker unit 4*b* is located between the first contour surface 4*aa* and the first inner circumferential surface region 10*a*. The second contour surface 4*ab* is adapted to the second inner circumferential surface region 10*b*.

In this disposition, on one hand, the first contour surface 4*aa* is spaced apart from the first inner circumferential surface region 10*a*, so that the second speaker unit 4*b* can be avoided by using the first contour surface 4*aa*, to provide avoidance space for disposition of the second speaker unit 4*b*, thereby facilitating disposition of the second speaker unit 4*b*. On the other hand, the second contour surface 4*ab* is adapted to the second inner circumferential surface region 10*b*, to help fitting disposition of the second contour surface 4*ab* and the second inner circumferential surface region 10*b*, to help set an overall volume of the first speaker unit 4*a* to be larger on the basis that the first speaker unit 4*a* provides the second speaker unit 4*b* with the avoidance space, thereby ensuring an effective vibration area of the diaphragm assembly in the first speaker unit 4*a*, and improving a sound output effect of the first speaker unit 4*a*.

It should be noted that the effective vibration area of the diaphragm assembly in this specification is an area of a part that is of the diaphragm assembly and that can push air to move. The effective vibration area of the diaphragm assembly is related to vibration frequency. A smaller effective vibration area of the diaphragm assembly indicates higher vibration frequency. Correspondingly, a larger effective vibration area of the diaphragm assembly indicates lower vibration frequency.

The second inner circumferential surface region 10*b* is a curved surface extending along the circumferential direction of the housing 1, and the second contour surface 4*ab* is a curved surface extending along the circumferential direction of the housing 1. Specifically, referring to FIG. 8, the second inner circumferential surface region 10*b* is an arc-shaped surface that extends along the circumferential direction of the housing 1 and that is arched away from the first inner circumferential surface region 10*a*, for example, a major-arc-shaped surface, and the second contour surface 4*ab* is an arc-shaped surface that extends along the circumferential direction of the housing 1 and that is arched away from the first contour surface 4*aa*, for example, a major-arc-shaped surface. For example, the inner circumferential surface of the housing 1 is a cylindrical surface, and the second contour surface 4*ab* is an arc-shaped surface extending along the circumferential direction of the housing 1. It may be understood that a shape of the second contour surface 4*ab* may be another shape, provided that it is ensured that the second contour surface 4*ab* is adapted to the inner circumferential surface of the housing 1.

To space the first contour surface 4*aa* apart from the first inner circumferential surface region 10*a*, reduce space occupied by the first speaker unit 4*a* in the housing 1, and ensure that the second speaker unit 4*b* can be integrated when the first speaker unit 4*a* is disposed, for example, the first contour surface 4*aa* is a plane. For another example, the first contour surface 4*aa* is an arc-shaped surface extending along the circumferential direction of the housing 1, and the first contour surface 4*aa* is arched toward the first inner circumferential surface region 10*b*.

Figure 9B:
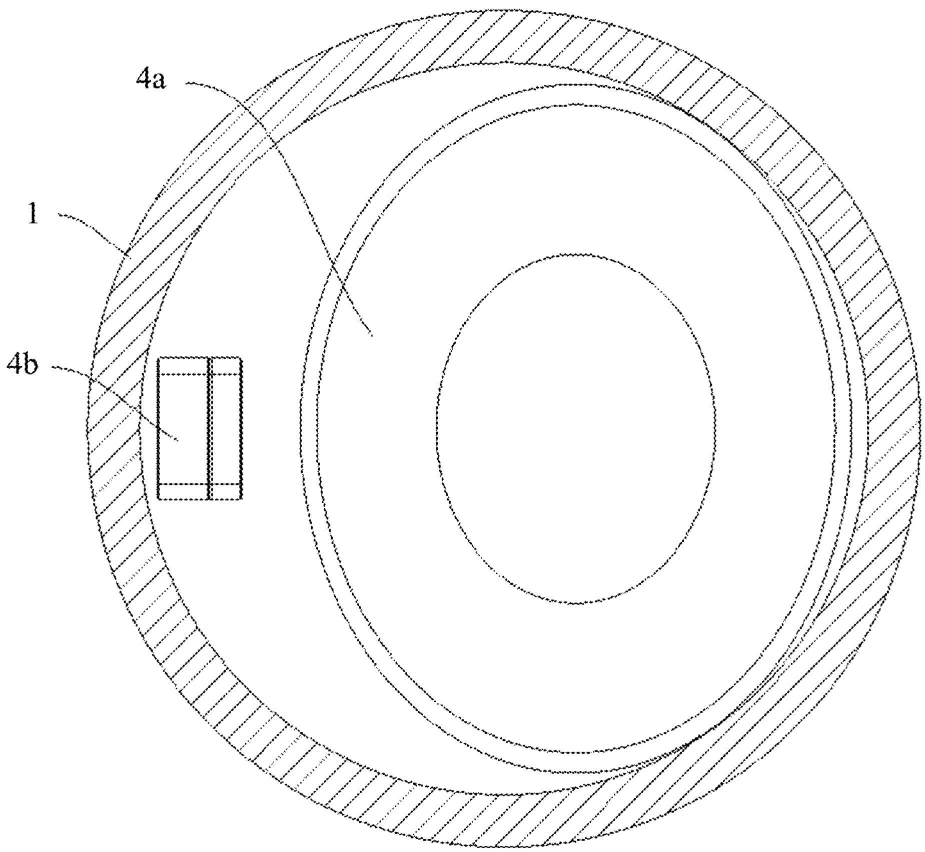
FIG. 9B is a schematic diagram of a structure of a cross section of a headset according to some other embodiments of this application.

It may be understood that an implementation of setting a position of the second speaker unit 4*b* based on a shape of the outer circumferential surface of the first speaker unit 4*a* is not limited thereto. In another embodiment, refer to FIG. 9B. FIG. 9B is a schematic diagram of a structure of a cross section of the headset 100 according to some other embodiments of this application. An outer circumferential contour of the first speaker unit 4*a* may be elliptical, and the second speaker unit 4*b* may be located at one end of a length direction of a short axis of the elliptical first speaker unit 4*a*. Specifically, the inner circumferential surface of the housing 1 is a cylindrical surface, the outer circumferential contour of the first speaker unit 4*a* may be elliptical, and the second speaker unit 4*b* may be located at one end of the length direction of the short axis of the elliptical first speaker unit 4*a*.

As described above, to provide avoidance space for disposition of the second speaker unit 4*b*, a shape of the first speaker unit 4*a* is improved. To ensure that a sound output effect of the first speaker unit 4*a* is not affected by a change of the shape of the first speaker unit 4*a*, structures of components of the first speaker unit 4*a* are also adaptively adjusted based on the change of the shape of the first speaker unit 4*a*. In the following description, the structure of the first speaker unit 4*a* is described in detail by using an example in which the first contour surface 4*aa* is a plane and the second contour surface 4*ab* is an arc-shaped surface extending along the circumferential direction of the housing 1. After reading this application, a person skilled in the art may understand that when the outer circumferential surface of the first speaker unit 4*a* is in another shape (for example, when the outer circumferential contour of the first speaker unit 4*a* is an ellipse extending along the circumferential direction of the housing 1), an overall structure of the first speaker unit 4*a* needs to be adaptively adjusted based on a change of the shape of the first speaker unit 4*a*.

Figure 10:
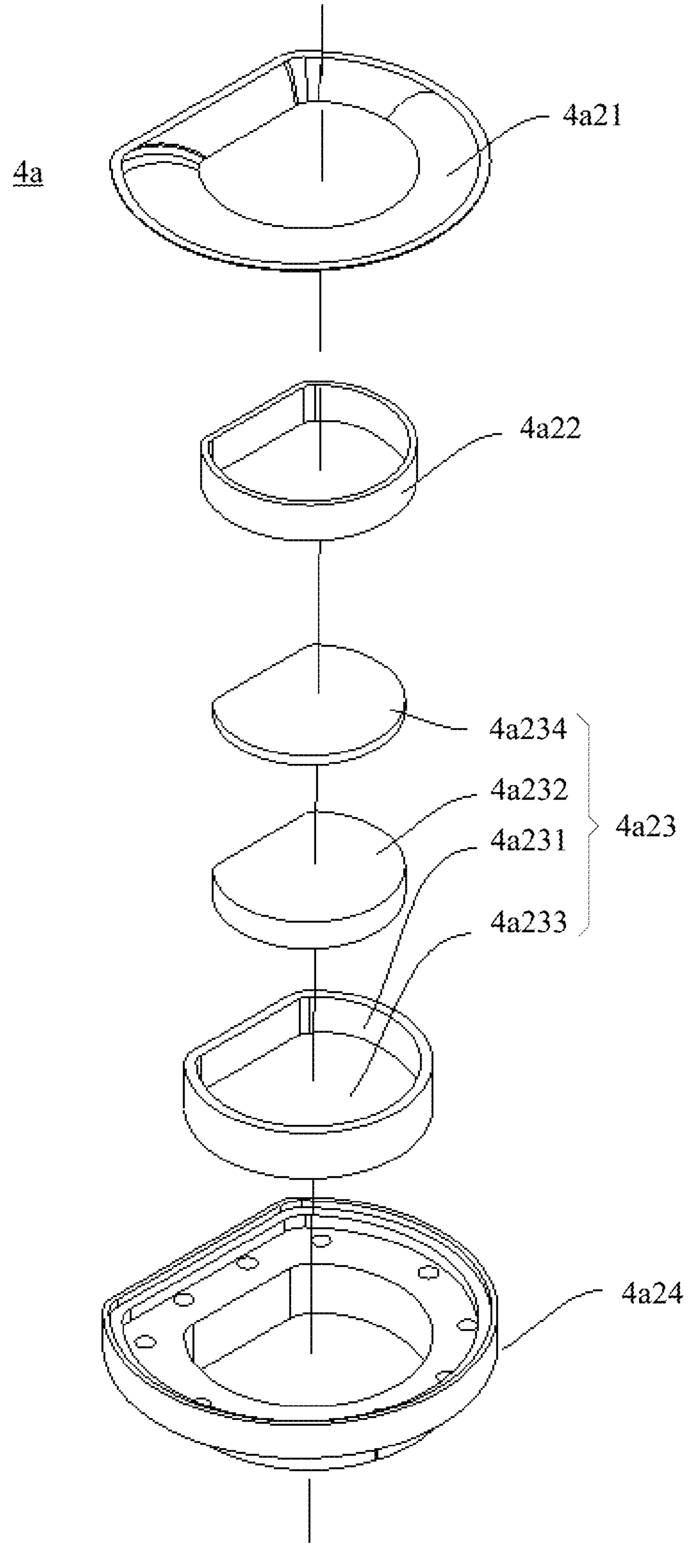
FIG. 10 is a schematic diagram of an exploded structure of the first speaker unit shown in FIG. 9A.

Refer to FIG. 10. FIG. 10 is a schematic diagram of an exploded structure of the first speaker unit 4*a* shown in FIG. 9A. In this embodiment, the first speaker unit 4*a* includes a first frame 4*a*24, a first diaphragm assembly 4*a*21, a first voice coil 4*a*22, and a first magnetic circuit system 4*a*23. The first frame 4*a*24, the first diaphragm assembly 4*a*21, the first voice coil 4*a*22, and the first magnetic circuit system 4*a*23 are coaxially disposed.

The first diaphragm assembly 4*a*21 is a main body that pushes air in a front cavity X1 of the first speaker unit 4*a* to move. When the first speaker unit 4*a* shown in FIG. 10 is applied to the housing 1 of the headset 100, referring back to FIG. 7, the first speaker unit 4*a* divides space in the housing 1 into the front cavity X1 and a rear cavity X2 by using the first diaphragm assembly 4*a*21 and the second speaker unit 4*b*.

To improve a sealing effect of the rear cavity X2, sealant 7 may be disposed between the second contour surface 4*ab* of the first speaker unit 4*a* and the second inner circumferential surface region 10*b* and between the first contour surface 4*aa* of the first speaker unit 4*a*, the second speaker unit 4*b*, and the first inner circumferential surface region 10*a*. The sealant 7 includes but is not limited to one or more of UV glue (also referred to as shadowless glue), polyurethane, silicone rubber, polysulfide rubber, chloroprene rubber, and epoxy resin sealant. A gap between the inner circumferential surface of the housing 1 and each of the first speaker unit 4*a* and the second speaker unit 4*b* may be sealed by using the sealant, so that the rear cavity K2 is formed as a closed cavity. This structure is simple and easy to operate, is suitable for sealing gaps of different shapes, and has a wide application range and relatively good flexibility. The sealant 7 further pastes the first speaker unit 4*a* and the second speaker unit 4*b* to the housing 1, to improve connection stability between the housing 1 and each of the first speaker unit 4*a* and the second speaker unit 4*b*.

It may be understood that FIG. 10 and the following related accompanying drawings merely show examples of some components included in the first speaker unit 4*a*. Actual sizes, actual positions, and actual structures of these components are not limited by FIG. 10 and the following accompanying drawings.

Specifically, the first frame 4*a*24 is used as a "support frame" of the first speaker unit 4*a* to support the first diaphragm assembly 4*a*21, the first voice coil 4*a*22, and the first magnetic circuit system 4*a*23.

A material of the first frame 4*a*24 includes but is not limited to metal, plastic, and a combination of metal and plastic. To improve support reliability of the first frame 4*a*24, metal may be selected as the material of the first frame 4*a*24. For example, the material of the first frame 4*a*24 is copper, iron, or aluminum.

The first frame 4*a*24 may be an integrally formed member, that is, the first frame 4*a*24 is an integral structure. This helps improve connection strength of the first frame 4*a*24. Certainly, this application is not limited thereto. The first frame 4*a*24 may alternatively be formed by assembling different components, and a plurality of different components may be connected through clamping, threading, gluing, welding, or the like.

Figure 11:
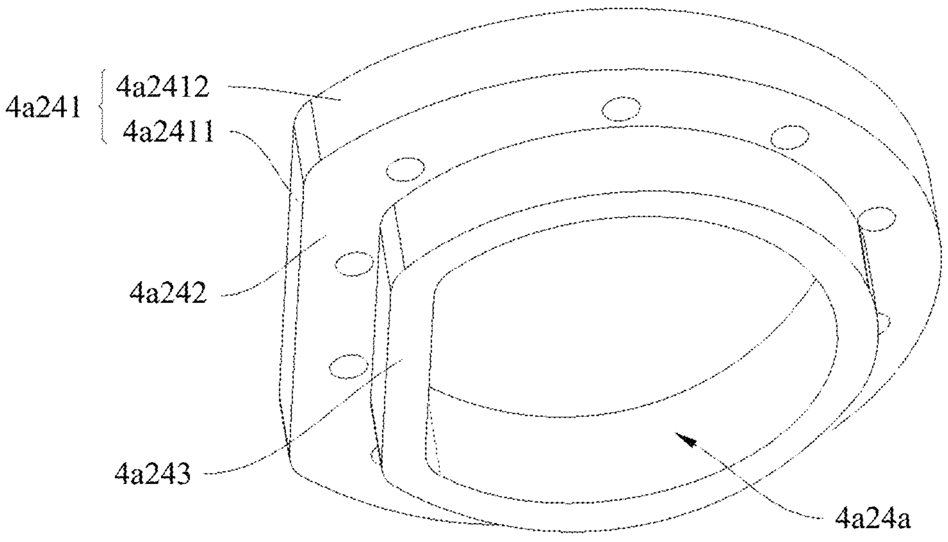
FIG. 11 is a schematic diagram of a structure of a first frame shown in FIG. 10.

Still refer to FIG. 10, and refer to FIG. 11. FIG. 11 is a schematic diagram of a structure of the first frame 4*a*24 shown in FIG. 10. In this embodiment, the first frame 4*a*24 includes an annular circumferential wall 4*a*241 and a bottom wall 4*a*242. The circumferential wall 4*a*241 and the housing 1 may be coaxially disposed. An end that is of the circumferential wall 4*a*241 and that is away from the sound output hole 110 is connected to the bottom wall 4*a*242. This can define internal space of the first frame 4*a*24, to facilitate installation of the first diaphragm assembly 4*a*21, the first voice coil 4*a*22, and the first magnetic circuit system 4*a*23.

Still referring to FIG. 11, the circumferential wall 4*a*241 includes a first part 4*a*2411 and a second part 4*a*2412. The first part 4*a*2411 and the second part 4*a*2412 are arranged and connected in a circumferential direction of the first frame 4*a*24.

The first part 4*a*2411 is in a shape of a slate, so that a surface that is of the first part 4*a*2411 and that faces away from the second part 4*a*2412 is formed as the first contour surface 4*aa*. An extending path of the second part 4*a*2412 along the circumferential direction of the first frame 4*a*24 is arc-shaped, so that a surface that is of the second part 4*a*2412 and that faces away from the first part 4*a*2411 is formed as the second contour surface 4*ab*. In this disposition, the first frame 4*a*24 can be directly used as a casing of the first speaker unit 4*a* without disposition of an additional casing. This can simplify the structure of the first speaker unit 4*a*, and reduce costs. In addition, this helps set a size of the first speaker unit 4*a* to be larger, thereby increasing an effective vibration area of the first diaphragm assembly 4*a*21, and ensuring a sound output effect of the first speaker unit 4*a*.

Figure 12:
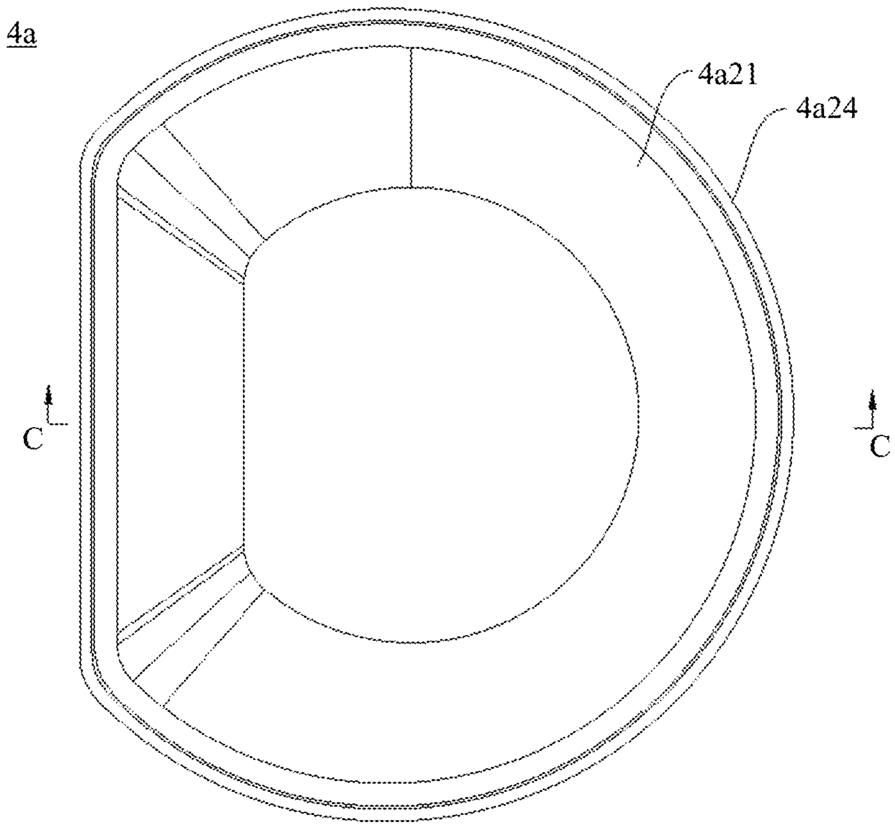
FIG. 12 is a schematic diagram of another direction of the first speaker unit shown in FIG. 9A.
Figure 13:
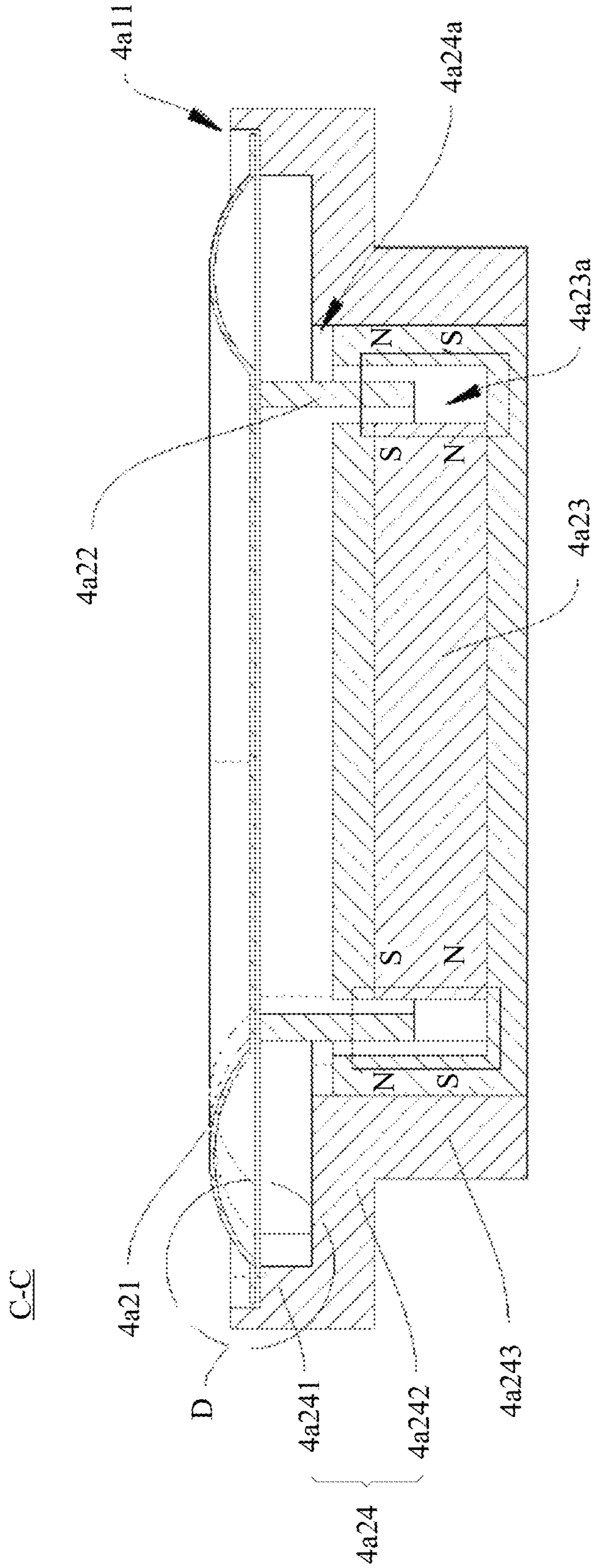
FIG. 13 is a schematic diagram of a structure of a cross section of the first speaker unit shown in FIG. 12 along a line C-C.

Refer to FIG. 12 and FIG. 13. FIG. 12 is a schematic diagram of another direction of the first speaker unit 4*a* shown in FIG. 9A. FIG. 13 is a schematic diagram of a structure of a cross section of the first speaker unit 4*a* shown in FIG. 12 along a line C-C. In this embodiment, an outer edge of the first diaphragm assembly 4*a*21 is connected to an inner circumferential wall of the first frame 4*a*24.

Figure 14:
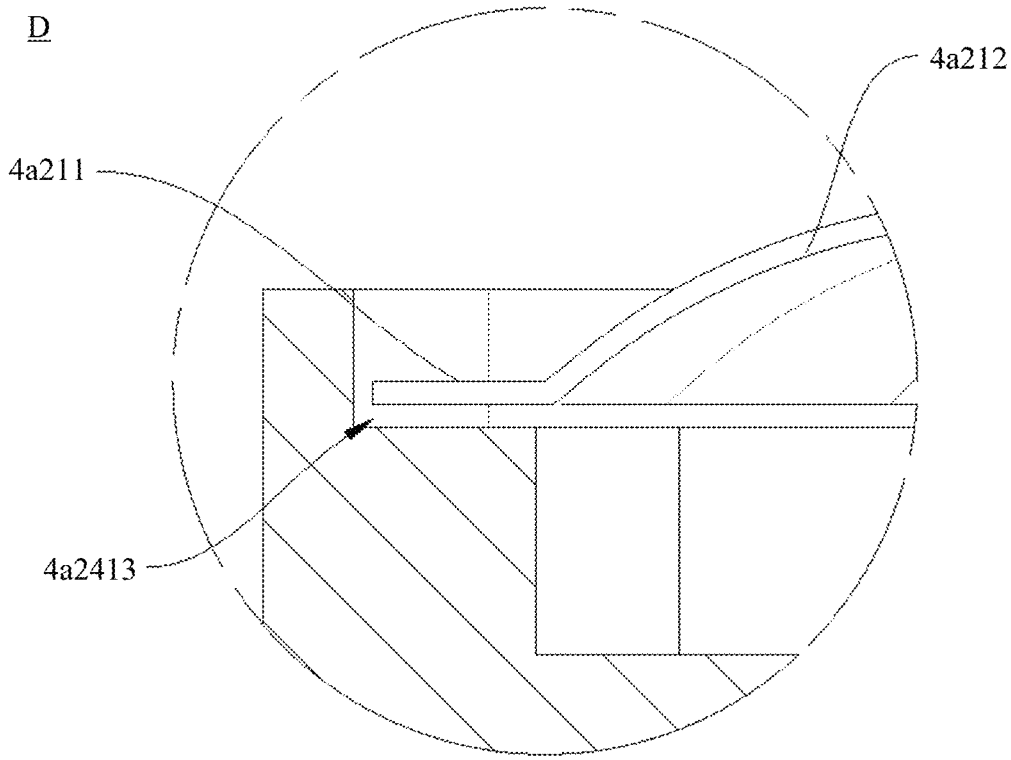
FIG. 14 is an enlarged view of a circled part D of the first speaker unit shown in FIG. 13.

Specifically, refer to FIG. 13, and refer to FIG. 14. FIG. 14 is an enlarged view of a circled part D of the first speaker unit 4*a* shown in FIG. 13. In this embodiment, an annular groove 4*a*2413 recessed toward a direction away from a central axis of the first frame 4*a*24 is disposed on an inner circumferential surface of the first frame 4*a*24, the annular groove 4*a*2413 extends to be annular along the circumferential direction of the first frame 4*a*24, the annular groove 4*a*2413 penetrates to an end surface of an open end of the first frame 4*a*24, namely, an end surface of an end facing the sound output hole 110, and the outer edge of the first diaphragm assembly 4*a*21 is accommodated in the annular groove 4*a*2413 and fastened to a bottom surface of the annular groove 4*a*2413. The outer edge of the first diaphragm assembly 4*a*21 is accommodated in the annular groove 4*a*2413 and fastened to the bottom surface of the annular groove 4*a*2413. This helps effectively support the first diaphragm assembly 4*a*21 by using the annular groove 4*a*2413. In addition, due to disposition of the annular groove 4*a*2413, a volume of space in the first frame 4*a*24 can be increased, to help set a size of the first diaphragm assembly 4*a*21 to be larger, thereby helping increase an effective vibration area of the first diaphragm assembly 4*a*21, and improve a sound output effect of the speaker 4. It may be understood that the annular groove 4*a*2413 may not be disposed on the first frame 4*a*24, and the outer edge of the first diaphragm assembly 4*a*21 may be directly connected to the inner circumferential wall 4*a*241 of the first frame 4*a*24.

Figure 15A:
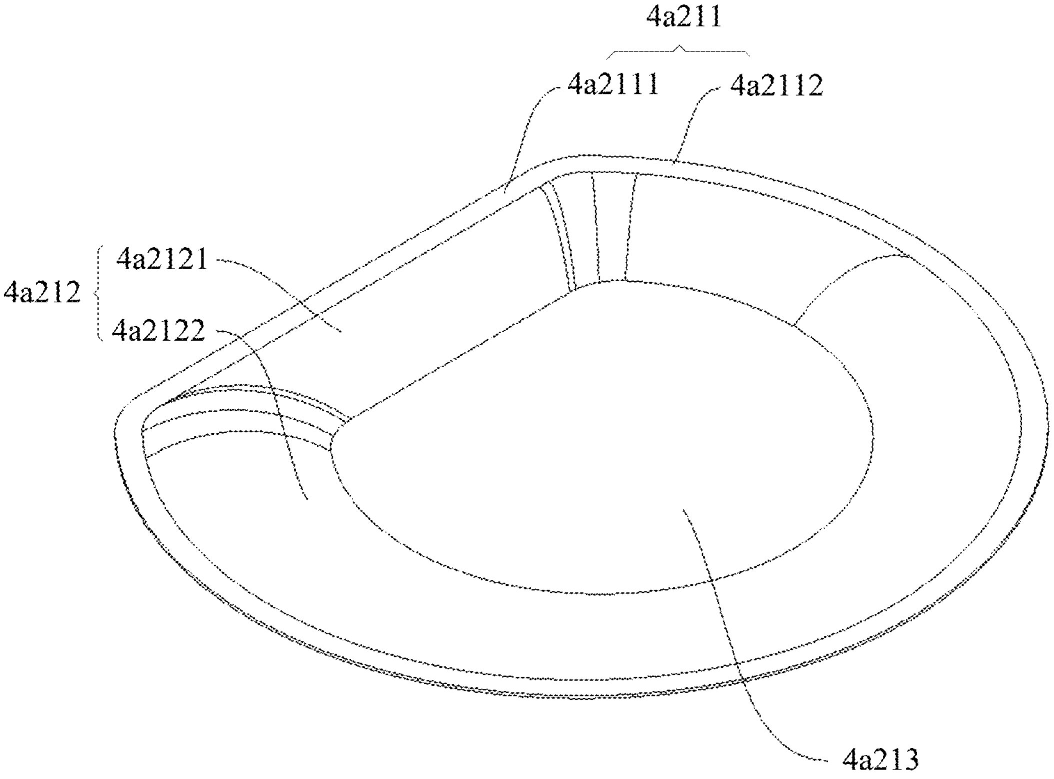
FIG. 15A is a schematic diagram of a structure of a first diaphragm assembly shown in FIG. 10.

Refer to FIG. 15A. FIG. FIG. 15A is a schematic diagram of a structure of the first diaphragm assembly 4*a*21 shown in FIG. 10. In this embodiment, the first diaphragm assembly 4*a*21 includes a first connection part 4*a*211, a first folded ring 4*a*212, and a first dome 4*a*213.

An outer circumferential edge of the first folded ring 4*a*212 is connected to an inner circumferential edge of the first connection part 4*a*211, so that a shape of the inner edge of the first connection part 4*a*211 is adapted to a shape of the outer edge of the first folded ring 4*a*212. An outer edge of the first dome 4*a*213 is connected to an inner edge of the first folded ring 4*a*212, so that a shape of the inner edge of the first folded ring 4*a*212 is adapted to a shape of the outer edge of the first dome 4*a*213.

Specifically, referring to FIG. 15A, and referring to FIG. 14, the first connection part 4*a*211 is in a shape of an annular plate. The first connection part 4*a*211 is disposed on the bottom surface of the annular groove 4*a*2413 in a stacked manner, so that the first diaphragm assembly 4*a*21 is connected to the first frame 4*a*24 by using the first connection part 4*a*211. A connection manner between the first connection part 4*a*211 and the annular groove 4*a*2413 includes but is not limited to gluing, clamping, welding, or screwing.

The first connection part 4*a*211 includes a first connection segment 4*a*2111 and a second connection segment 4*a*2112.

The first connection segment 4a2111 and the second connection segment 4a2112 are arranged and connected in the circumferential direction of the first frame 4a24.

Figure 15B:
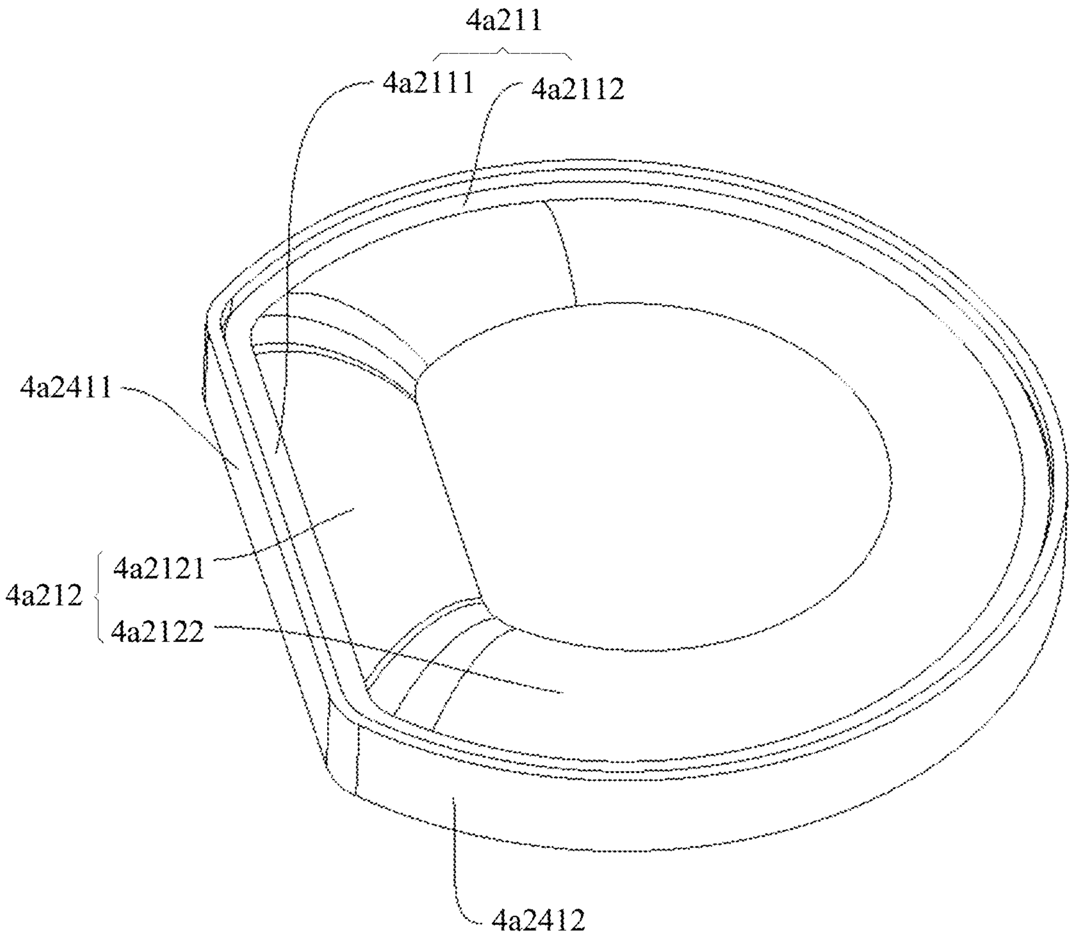
FIG. 15B is a schematic diagram of assembling between a first diaphragm assembly and a first frame shown in FIG. 10.

Specifically, still refer to FIG. 15A, and refer to FIG. 15B. FIG. 15B is a schematic diagram of assembling between the first diaphragm assembly 4a21 and the first frame 4a24 shown in FIG. 10. The first connection segment 4a2111 linearly extends in the circumferential direction of the first frame 4a24, and the first connection segment 4a2111 is located between the first part 4a2411 and the second connection segment 4a2112. In this way, an extending path of the first connection segment 4a2111 in the circumferential direction of the first frame 4a24 can be the same as an extending path of the first part 4a2411 in the circumferential direction of the first frame 4a24, so that the first connection segment 4a2111 is correspondingly adapted to the first part 4a2411.

The second connection segment 4a2112 extends to be arc-shaped along the circumferential direction of the first frame 4a24, and the second connection segment 4a2112 is located between the second part 4a2412 and the first connection segment 4a2111. In this way, an extending path of the second connection segment 4a2112 in the circumferential direction of the first frame 4a24 can be the same as the extending path of the second part 4a2412 in the circumferential direction of the first frame 4a24, so that the second connection segment 4a2112 is correspondingly adapted to the second part 4a2412. Specifically, the second connection segment 4a2112 and the second part 4a2412 have a same central axis.

The first folded ring 4a212 includes a first segment 4a2121 and a second segment 4a2122. The first segment 4a2121 and the second segment 4a2122 are arranged and connected in the circumferential direction of the first frame 4a24.

The first segment 4a2121 linearly extends in the circumferential direction of the first frame 4a24, and the first segment 4a2121 is located between the first connection segment 4a2111 and the second segment 4a2122. In this way, an extending path of the first segment 4a2121 in the circumferential direction of the first frame 4a24 is the same as the extending path of the first part 4a2411 in the circumferential direction of the first frame 4a24, so that the first segment 4a2121 can correspond to the first part 4a2411.

The second segment 4a2122 extends to be arc-shaped in the circumferential direction of the first frame 4a24, and the second segment 4a2122 is located between the second connection segment 4a2112 and the first segment 4a2121. In this way, an extending path of the second segment 4a2122 along the circumferential direction of the first frame 4a24 is the same as the extending path of the second part 4a2412 along the circumferential direction of the first frame 4a24, so that the second segment 4a2122 corresponds to the second part 4a2412. Specifically, the second segment 4a2122 and the second part 4a2412 have a same central axis.

According to the first diaphragm assembly 4a21 in this embodiment of this application, shapes of the first connection part 4a211, the first folded ring 4a212, and the first dome 4a213 of the first diaphragm assembly 4a21 are all adapted to a shape of the circumferential wall 4a241 of the first frame 4a24, to help improve connection reliability between the first diaphragm assembly 4a21 and the first frame 4a24, and help set a size of the first diaphragm assembly 4a21 to be larger, thereby ensuring an effective vibration area of the first diaphragm assembly 4a21, and improving a sound output effect of the first speaker unit 4a.

Figure 16:
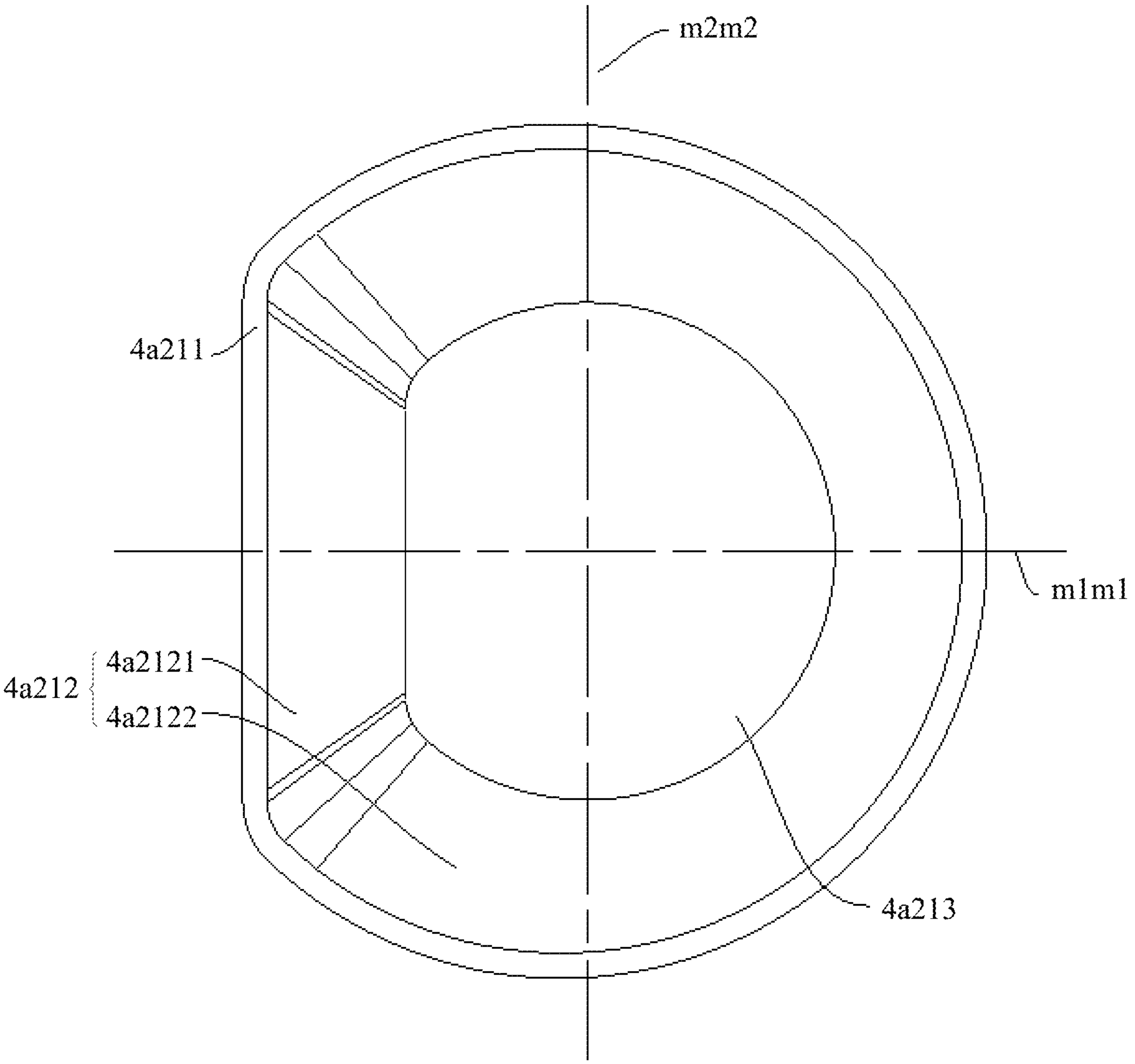
FIG. 16 is a schematic diagram of another direction of the first diaphragm assembly shown in FIG. 15A.

It may be understood that the shapes of the first connection part 4a211, the first folded ring 4a212, and the first dome 4a213 are all adapted to the shape of the circumferential wall 4a241 of the first frame 4a24. In this way, the first diaphragm assembly 4a21 is in a symmetric shape. Refer to FIG. 16. FIG. 16 is a schematic diagram of another direction of the first diaphragm assembly 4a shown in FIG. 15A. In this example, the first diaphragm assembly 4a21 is symmetrically disposed by using a plane m1m1 that passes through an axis of the second segment 4a2122 and that is perpendicular to the first segment 4a2121 as a symmetry plane. In this way, when the first voice coil 4a22 drives the first diaphragm assembly 4a21 to vibrate, this helps enable the first diaphragm assembly 4a21 to receive driving forces of a same magnitude on two sides of the symmetry plane, thereby helping prevent a rolling vibration phenomenon from occurring on the first diaphragm assembly 4a21 in a direction perpendicular to the symmetry plane.

The first diaphragm assembly 4a21 is symmetrically disposed in a direction perpendicular to the first segment 4a2121. However, because a shape and a size of the first segment 4a2121 are different from a shape and a size of the second segment 4a2122, asymmetric disposition between the first segment 4a2121 and the second segment 4a2122 is caused, that is, the first segment 4a2121 and the second segment 4a2122 cannot be symmetrical with respect to a plane m2m2 in FIG. 16. The plane m2m2 is perpendicular to the plane m1m1 and passes through the axis of the second segment 4a2122. Therefore, when the first voice coil 4a22 drives the first diaphragm assembly 4a21 to vibrate, there is a large difference in magnitudes of driving forces received by the first diaphragm assembly 4a21 on two sides of the plane m2m2. As a result, the first diaphragm assembly 4a21 cannot vibrate in a piston type, and the first diaphragm assembly 4a21 has a risk of rolling vibration in a direction perpendicular to the plane m2m2. To reduce a difference between driving forces received by the first diaphragm assembly 4a21, the first segment 4a2121 is equal to the second segment 4a2122 in width.

In some examples, the first diaphragm assembly 4a21 is an integrally formed member. That is, the first connection part 4a211, the first folded ring 4a212, and the first dome 4a213 are an integral structure. This disposition helps improve structural strength of the first diaphragm assembly 4a21, thereby facilitating processing and manufacturing of the first diaphragm assembly 4a21. Certainly, this application is not limited thereto. Alternatively, after the first connection part 4a211, the first folded ring 4a212, and the first dome 4a213 are separately processed, the first connection part 4a211 and the first folded ring 4a212 may be connected through gluing, and the first folded ring 4a212 and the first dome 4a213 may be connected through gluing.

Figure 17A:
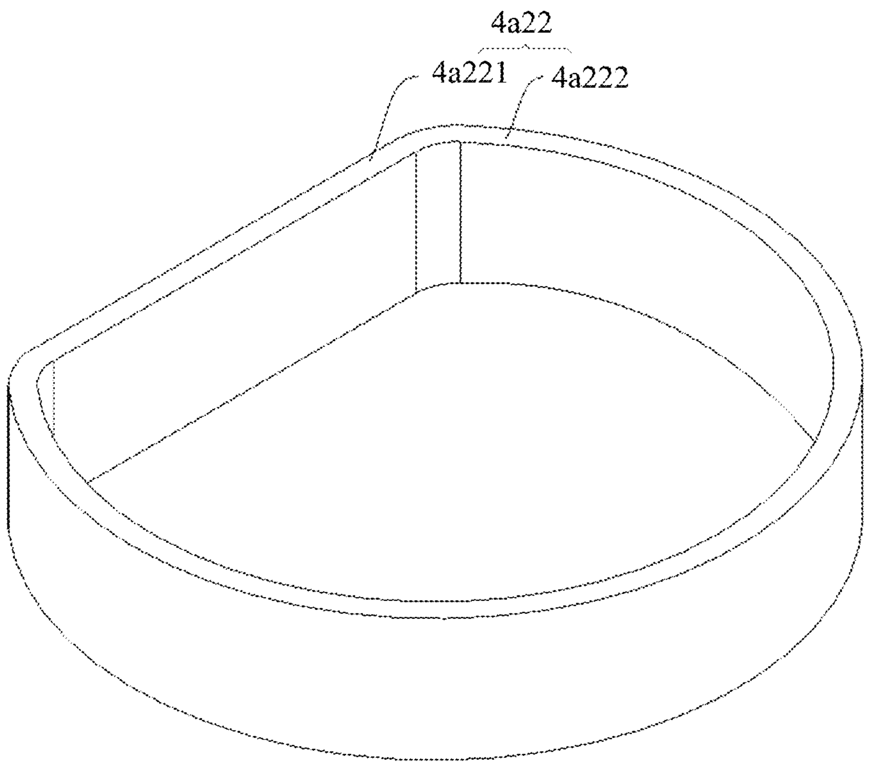
FIG. 17A is a schematic diagram of a structure of a first voice coil shown in FIG. 10.

Based on the foregoing embodiments, refer to FIG. 17A, and refer to FIG. 13 together. FIG. 17A is a schematic diagram of a structure of the first voice coil 4a22 shown in FIG. 10. The first voice coil 4a22 is connected to an inner surface (namely, a surface of a side facing away from the sound output hole 110) of the first dome 4a213. A connection manner between the first voice coil 4a22 and the first dome 4a213 includes but is not limited to gluing.

The first voice coil 4a22 includes a first voice coil part 4a221 and a second voice coil part 4a222, and the first voice coil part 4a221 and the second voice coil part 4a222 are arranged and connected in the circumferential direction of the first frame 4a24.

Figure 17B:
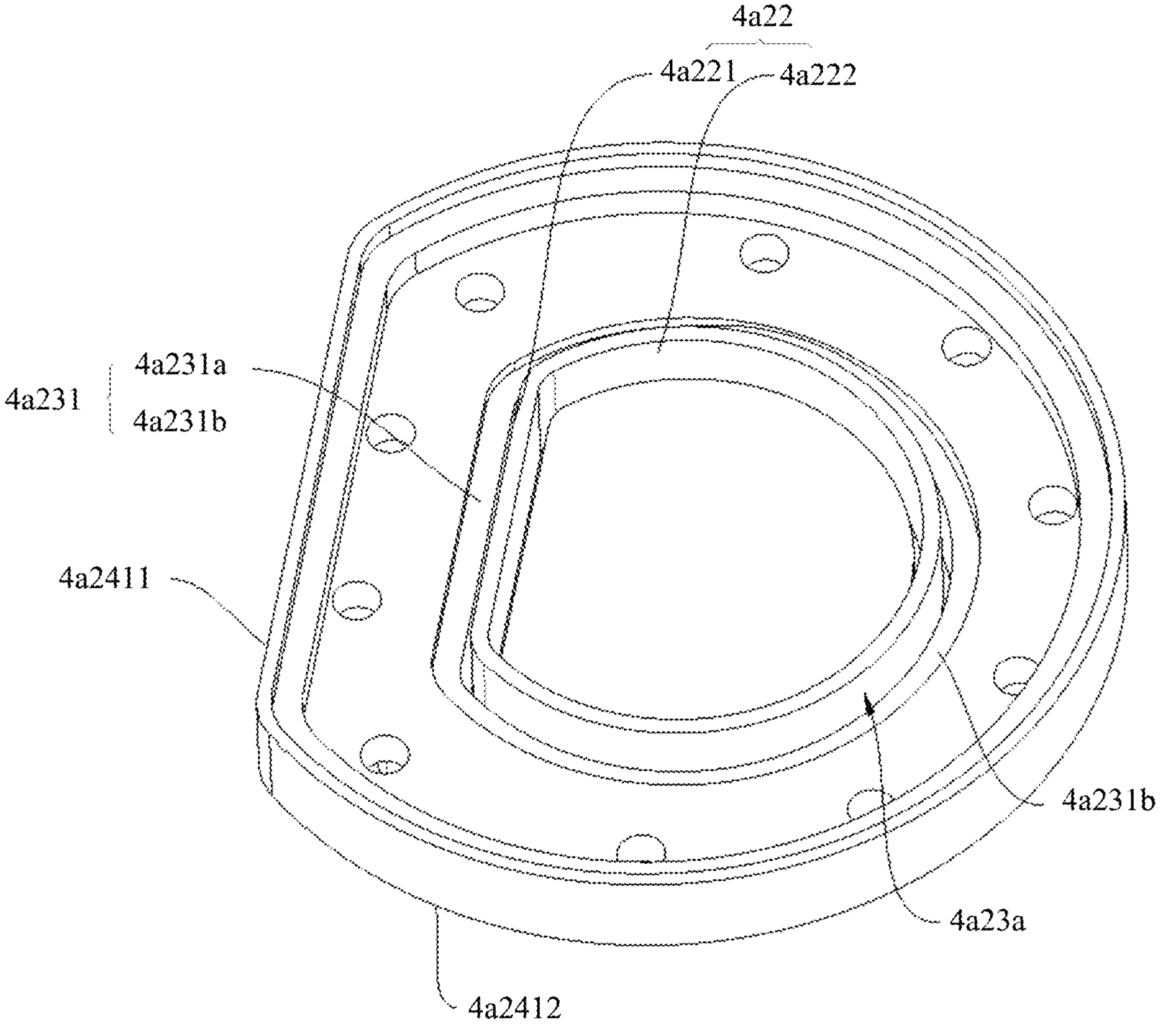
FIG. 17B is a schematic diagram of cooperation between a first voice coil, a first frame, and a first magnetic circuit system shown in FIG. 10.

Refer to FIG. 17A and FIG. 17B. FIG. 17B is a schematic diagram of cooperation between the first voice coil 4a22, the first frame 4a24, and the first magnetic circuit system 4a23 shown in FIG. 10. The first voice coil part 4a221 is formed in a shape of a slate parallel to the first part 4a2411, and the first voice coil part 4a221 is located between the first part 4a2411 and the second voice coil part 4a222. In this way, an extending path of the first voice coil part 4a221 in the circumferential direction of the first frame 4a24 is the same as the extending path of the first part 4a2411 in the circumferential direction of the first frame 4a24, so that the first voice coil part 4a221 can correspond to the first part 4a2411.

The second voice coil part 4a222 extends to be arc-shaped in the circumferential direction of the first frame 4a24. The second voice coil part 4a222 is located between the second part 4a2412 and the first voice coil part 4a221. In this way, an extending path of the second voice coil part 4a222 along the circumferential direction of the first frame 4a24 is the same as the extending path of the second part 4a2412 along the circumferential direction of the first frame 4a24, so that the second voice coil part 4a222 can correspond to the second part 4a2412. Specifically, the second voice coil part 4a222 and the second part 4a2412 have a same central axis.

According to the first voice coil 4a22 in this embodiment of this application, the first voice coil 4a22 includes the first voice coil part 4a221 and the second voice coil part 4a222, the first voice coil part 4a221 and the second voice coil part 4a222 are arranged and connected in the circumferential direction of the first frame 4a24, the extending path of the first voice coil part 4a221 in the circumferential direction of the first frame 4a24 is the same as the extending path of the first part 4a2411 in the circumferential direction of the first frame 4a24, and the extending path of the second voice coil part 4a222 along the circumferential direction of the first frame 4a24 is the same as the extending path of the second part 4a2412 along the circumferential direction of the first frame 4a24. Therefore, a shape of the first voice coil 4a22 is adapted to shapes of the first diaphragm assembly 4a21 and the first frame 4a23. This helps implement compactness of the structure of the first speaker unit 4a. Furthermore, when the first voice coil 4a22 pushes the first diaphragm assembly 4a21 to vibrate, this can improve uniformity of a driving force of the first voice coil 4a22 for the first diaphragm assembly 4a21 in a circumferential direction to at least a specific degree, and can avoid, to at least a specific degree, a problem that polarization or rolling vibration occurs on the first diaphragm assembly 4a21 because a shape of the first voice coil 4a22 is not adapted to a shape of the first diaphragm assembly 4a21.

Further, to ensure effective vibration at a center of the first dome 4a213 and effective push of the first voice coil 4a22 for the first diaphragm assembly 4a21, an outer circumferential surface of the first voice coil 4a22 is flush with an outer circumferential surface of the first dome 4a213 along an axial direction of the first voice coil 4a22.

Figure 18:
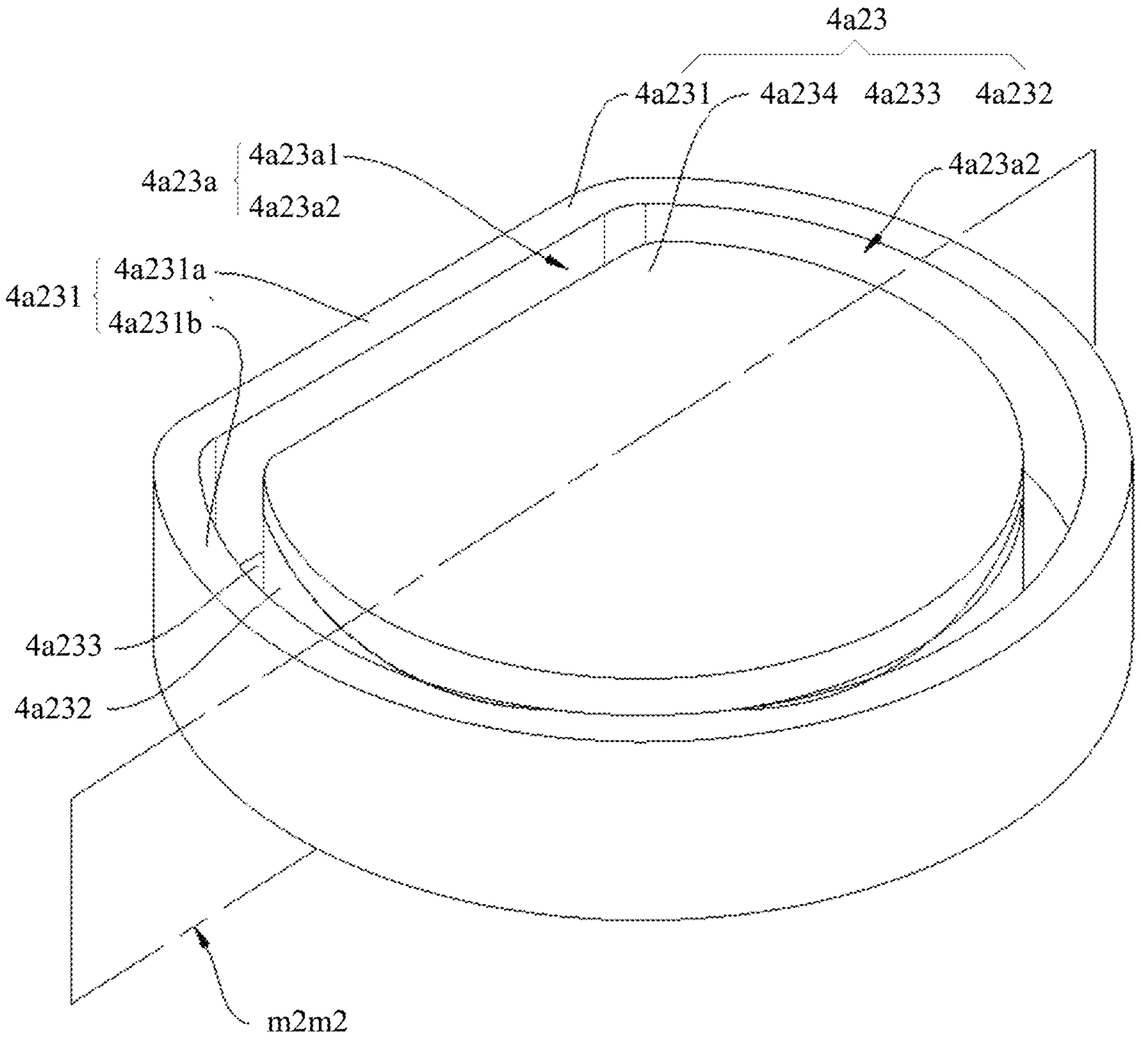
FIG. 18 is a schematic diagram of a structure of a first magnetic circuit system shown in FIG. 10.

Based on the foregoing embodiments, refer to FIG. 18, and refer to FIG. 13 together. FIG. 18 is a schematic diagram of a structure of the first magnetic circuit system 4a23 shown in FIG. 10. The first magnetic circuit system 4a23 has an annular magnetic gap 4a23a, and an end that is of the first voice coil 4a22 and that is away from the first diaphragm assembly 4a21 can extend into the magnetic gap 4a23a, so that the first magnetic circuit system 4a23 can cooperate with the first voice coil 4a22 to drive the first diaphragm assembly 4a21 to synchronously vibrate.

Furthermore, the first magnetic circuit system 4a23 is fastened to the first frame 4a24. Specifically, an installation through hole 4a24a penetrating through the bottom wall 4a242 is disposed on the bottom wall 4a242 of the frame 424, and an annular flange 4a243 surrounding the installation through hole 4a24a is disposed on a surface that is of the bottom wall 4a242 and that faces away from the circumferential wall 4a241. The first magnetic circuit system 4a23 is fastened to the installation through hole 4a24a, and is limited by being surrounded by the annular flange 4a243. Certainly, it may be understood that, when the installation through hole 4a24a and the annular flange 4a243 are not disposed on the first frame 4a24, the first magnetic circuit system 4a23 may be disposed in the first frame 4a24.

It may be understood that the first voice coil 4a22 is connected to the side that is of the first dome 4a213 and that faces away from the sound output hole 110, and the end that is of the first voice coil 4a22 and that is away from the first diaphragm assembly 4a21 cooperates with the magnetic gap 4a23a of the first magnetic circuit system 4a23. In this way, compared with a solution in which the first voice coil 4a22 is connected to a side that is of the first dome 4a213 and that faces the sound output hole 110, and the end that is of the first voice coil 4a22 and that is away from the first diaphragm assembly 4a21 cooperates with the magnetic gap 4a23a of the first magnetic circuit system 4a23, an outer surface that is of the first diaphragm assembly 4a21 and that faces the sound output hole 110 can be not blocked by the first magnetic circuit system 4a23 or the first voice coil 4a22, to help ensure a sound output area of the first diaphragm assembly 4a21, and further improve a sound output effect of the first speaker unit 4a.

Still referring to FIG. 18, the magnetic gap 4a23a includes a first gap part 4a23a1 and a second gap part 4a23a2. The first gap part 4a23a1 and the second gap part 4a23a2 are arranged and connected in the circumferential direction of the first frame 4a24. The first gap part 4a23a1 linearly extends in the circumferential direction of the first frame 4a24. In this way, an extending path of the first gap part 4a23a1 in the circumferential direction of the first frame 4a24 can be the same as the extending path of the first voice coil part 4a221 in the circumferential direction of the first frame 4a24, so that the first gap part 4a23a1 is adapted to the first voice coil part 4a221 and allows the first voice coil part 4a221 to extend into the first gap part 4a23a1. The second gap part 4a23a2 extends to be arc-shaped in the circumferential direction of the first frame 4a24. In this way, an extending path of the second gap part 4a23a2 in the circumferential direction of the first frame 4a24 can be the same as the extending path of the second voice coil part 4a222 in the circumferential direction of the first frame 4a24, so that the second gap part 4a23a2 is adapted to the second voice coil part 4a222 and allows the second voice coil part 4a222 to extend into the second gap part 4a23a2.

According to the first magnetic circuit system 4a23 in this embodiment of this application, the magnetic gap 4a23a includes the first gap part 4a23a1 and the second gap part 4a23a2, the first gap part 4a23a1 is adapted to the first voice coil part 4a221, and the second gap part 4a23a2 is adapted to the second voice coil part 4a222. In this way, a shape of the entire magnetic gap 4a23a can be adapted to a shape of the first voice coil 4a22. This helps ensure cooperation reliability between the first voice coil 4a22 and the first magnetic circuit system 4a23. Therefore, when the first voice coil 4a22 cooperates with the first magnetic circuit system 4a23 to drive the first diaphragm assembly 4a21 to vibrate, this can help ensure uniformity of a driving force for the first diaphragm assembly 4a21 in the circumferential direction of the first frame 4a24, and avoid, to at least a specific degree, a problem that rolling vibration occurs on the first diaphragm assembly 4a21.

Specifically, a width of the first gap part 4*a*23*a*1 is less than a width of the second gap part 4*a*23*a*2. A smaller width of the magnetic gap indicates a larger driving force generated for the diaphragm assembly after the magnetic circuit system cooperates with the voice coil, and a larger width of the magnetic gap indicates a smaller driving force generated for the diaphragm assembly after the magnetic circuit system cooperates with the voice coil. Therefore, for the first speaker unit 4*a* that is not symmetrically disposed by using the plane m2*m*2 as a symmetry plane, when the first diaphragm assembly 4*a*21 vibrates, a driving force received on a side that is of the first diaphragm assembly 4*a*21 and that is close to the first part 4*a*2411 is less than a driving force received on a side that is of the first diaphragm assembly 4*a*21 and that is close to the second part 4*a*2412, and consequently there is a risk of rolling vibration. The width of the first gap part 4*a*23*a*1 is less than the width of the second gap part 4*a*23*a*2. This helps increase the driving force received on the side that is of the first diaphragm assembly 4*a*21 and that is close to the first part 4*a*2411, thereby improving, to at least a specific degree, uniformity of a driving force received by the first diaphragm assembly 4*a*21 in the circumferential direction of the first frame 4*a*24, and avoiding a problem that rolling vibration occurs on the first diaphragm assembly 4*a*21.

Still referring to FIG. 18, the first magnetic circuit system 4*a*23 includes an edge magnetic part 4*a*231 and a first central magnetic part 4*a*232. The edge magnetic part 4*a*231 is located on the outer circumference of the first central magnetic part 4*a*232, to define the magnetic gap 4*a*23*a* with the first central magnetic part 4*a*232. A magnetization direction of the edge magnetic part 4*a*231 is opposite to a magnetization direction of the first central magnetic part 4*a*232, so that the edge magnetic part 4*a*231 and the first central magnetic part 4*a*232 can form a magnetic loop for driving the first voice coil 4*a*22 to move. For example, along an axial direction of the first frame 4*a*24 and in a direction away from the first diaphragm assembly 4*a*21, the magnetization direction of the edge magnetic part 4*a*231 is from a north (N) pole to a south (S) pole, and the magnetization direction of the first central magnetic part 4*a*232 is from a south (S) pole to a north (N) pole.

Still referring to FIG. 18, the edge magnetic part 4*a*231 may be formed to be annular, and the edge magnetic part 4*a*231 includes a first subpart 4*a*231*a* and a second subpart 4*a*231*b*. The first subpart 4*a*231*a* and the second subpart 4*a*231*b* are arranged and connected in the circumferential direction of the first frame 4*a*24.

Still referring to FIG. 18, and referring to FIG. 17B, the first subpart 4*a*231*a* is in a shape of a slate, and the first subpart 4*a*231*a* is located between the first part 4*a*2411 and the second subpart 4*a*231*b*. In this way, an extending path of the first subpart 4*a*231*a* in the circumferential direction of the first frame 4*a*24 may be the same as the extending path of the first part 4*a*2411 in the circumferential direction of the first frame 4*a*24. The second subpart 4*a*231*b* extends to be arc-shaped along the circumferential direction of the first frame 4*a*24, and the second subpart 4*a*231*b* is located between the second part 4*a*2412 and the first subpart 4*a*231*a*. In this way, an extending path of the second subpart 4*a*231*b* in the circumferential direction of the first frame 4*a*24 may be the same as the extending path of the second part 4*a*2412 in the circumferential direction of the first frame 4*a*24. Specifically, the second subpart 4*a*231*b* and the second part 4*a*2412 have a same central axis.

Figure 19:
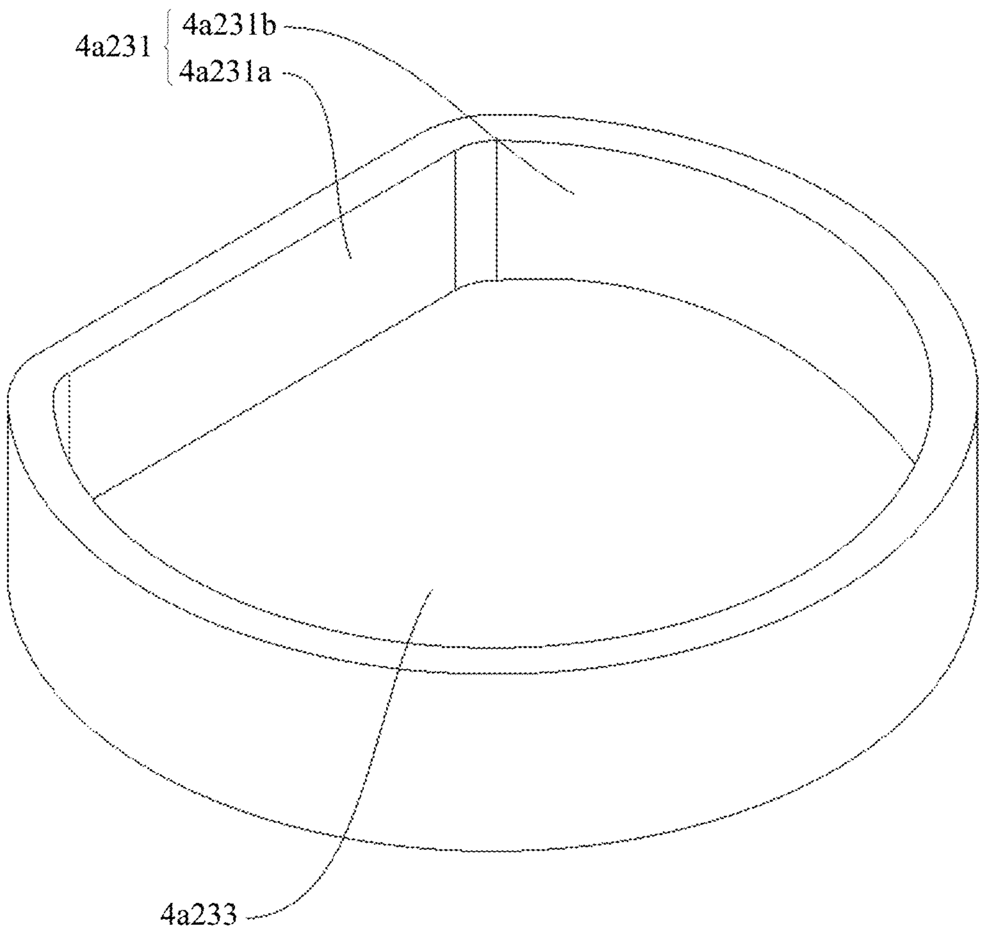
FIG. 19 is a schematic diagram of a structure of cooperation between an edge magnetic part and a second central magnetic part of the first magnetic circuit system shown in FIG. 18.

Refer to FIG. 19. FIG. 19 is a schematic diagram of a structure of cooperation between the edge magnetic part 4*a*231 and a second central magnetic part 4*a*233 of the first magnetic circuit system 4*a*23 shown in FIG. 18. To effectively support the first central magnetic part 4*a*232, the first magnetic circuit system 4*a*23 further includes the second central magnetic part 4*a*233, the second central magnetic part 4*a*233 blocks an end that is of the edge magnetic part 4*a*231 and that is away from the first diaphragm assembly 4*a*21, and the first central magnetic part 4*a*232 and the second central magnetic part 4*a*233 are disposed in a stacked manner.

The second central magnetic part 4*a*233 and the edge magnetic part 4*a*231 may be an integrally formed member. That is, the second central magnetic part 4*a*233 and the edge magnetic part 4*a*231 may be an integral structure. The second central magnetic part 4*a*233 and the edge magnetic part 4*a*231 may alternatively be connected through gluing, clamping, threading, or the like.

Specifically, the second central magnetic part 4*a*233 may be a magnetic conductive material member. In this way, leakage of a magnetic force line may be restricted by using the second central magnetic part 4*a*233, to increase magnetic induction intensity of the first magnetic circuit system 4*a*23. Certainly, this application is not limited thereto. In some other examples, the second central magnetic part 4*a*233 may be a magnetic body. Specifically, the magnetic body is a magnet or magnetic steel.

Figure 20:
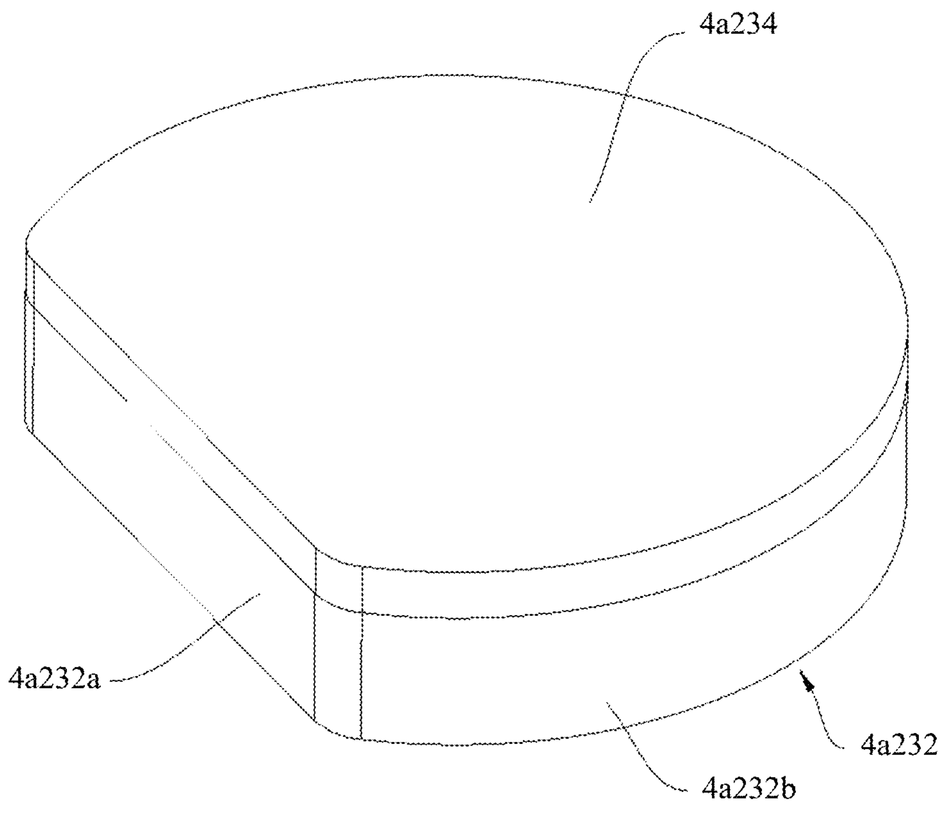
FIG. 20 is a schematic diagram of cooperation between a first central magnetic part and a magnetic conductive yoke of the first magnetic circuit system shown in FIG. 18.

Refer to FIG. 20, and refer to FIG. 18. FIG. 20 is a schematic diagram of cooperation between the first central magnetic part 4*a*232 and a magnetic conductive yoke 4*a*234 of the first magnetic circuit system 4*a*23 shown in FIG. 18. An outer circumferential surface of the first central magnetic part 4*a*232 includes a first surface 4*a*232*a* and a second surface 4*a*232*b*.

The first surface 4*a*232*a* and the second surface 4*a*232*a* are arranged and connected in the circumferential direction of the first frame 4*a*24. The first surface 4*a*232*a* is a plane parallel to the first contour surface 4*aa*, and the first surface 4*a*232*a* corresponds to and is spaced apart from the first subpart 4*a*231*a*, to define the first gap part 4*a*23*a*1.

The second surface 4*a*232*b* is an arc-shaped surface extending along the circumferential direction of the first frame 4*a*24, and the second surface 4*a*232*b* corresponds to and is spaced apart from the second subpart 4*a*231*b*, to define the second gap part 4*a*23*a*2. Specifically, the second surface 4*a*232*b* and the second contour surface 4*ab* have a same central axis.

In this way, the first magnetic circuit system 4*a*23 in this embodiment of this application can define the magnetic gap 4*a*23*a* whose shape is adapted to the shape of the first voice coil 4*a*22. This helps ensure cooperation reliability between the first voice coil 4*a*22 and the first magnetic circuit system 4*a*23. Therefore, when the first voice coil 4*a*22 cooperates with the first magnetic circuit system 4*a*23 to drive the first diaphragm assembly 4*a*21 to vibrate, this ensures uniformity of a driving force for the first diaphragm assembly 4*a*21 in the circumferential direction of the first frame 4*a*24, and avoids a problem that rolling vibration occurs on the first diaphragm assembly 4*a*21.

In some examples, both the edge magnetic part 4*a*231 and the first central magnetic part 4*a*232 may be magnetic bodies. For example, both the edge magnetic part 4*a*231 and the first central magnetic part 4*a*232 are magnets or magnetic steel. Certainly, this application is not limited thereto. In another embodiment, one of the edge magnetic part 4*a*231 and the first central magnetic part 4*a*232 is a magnetic body, and the other is a magnetic conductive material member.

To increase magnetic induction intensity of the first magnetic circuit system 4a23, referring to FIG. 20, and referring to FIG. 18, the first magnetic circuit system 4a23 further includes the magnetic conductive yoke 4a234. The magnetic conductive yoke 4a234 is disposed on a side that is of the first central magnetic part 4a232 and that faces the first diaphragm assembly 4a21, to restrict leakage of the magnetic force line, thereby improving a driving force for the first diaphragm assembly 4a21.

Specifically, an outer circumferential surface of the magnetic conductive yoke 4a234 is flush with the outer circumferential surface of the first central magnetic part 4a232 in an axial direction of the first magnetic circuit system 4a23. Therefore, a shape of the outer circumferential surface of the magnetic conductive yoke 4a234 is the same as a shape of the outer circumferential surface of the first central magnetic part 4a232, and the magnetic conductive yoke 4a234 is adapted to the first central magnetic part 4a232. This helps further improve a restriction effect of the magnetic conductive yoke 4a234 for the magnetic force line, and increase magnetic induction intensity of the first magnetic circuit system 4a23. Furthermore, the magnetic conductive yoke 4a234 does not affect the magnetic gap 4a23a, thereby helping improve adaption between the first magnetic circuit system 4a23 and the first voice coil 4a22.

Figure 21:
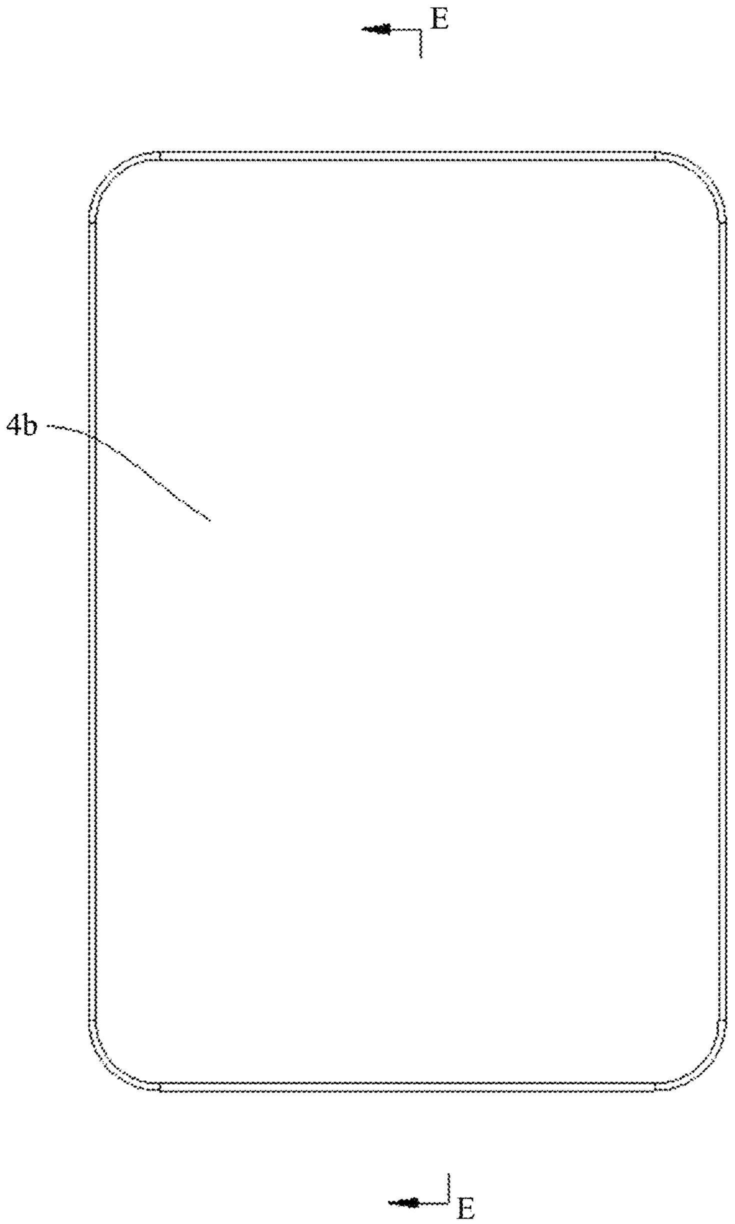
FIG. 21 is a schematic diagram of a structure of a second speaker unit in the headset shown in FIG. 6.
Figure 22:
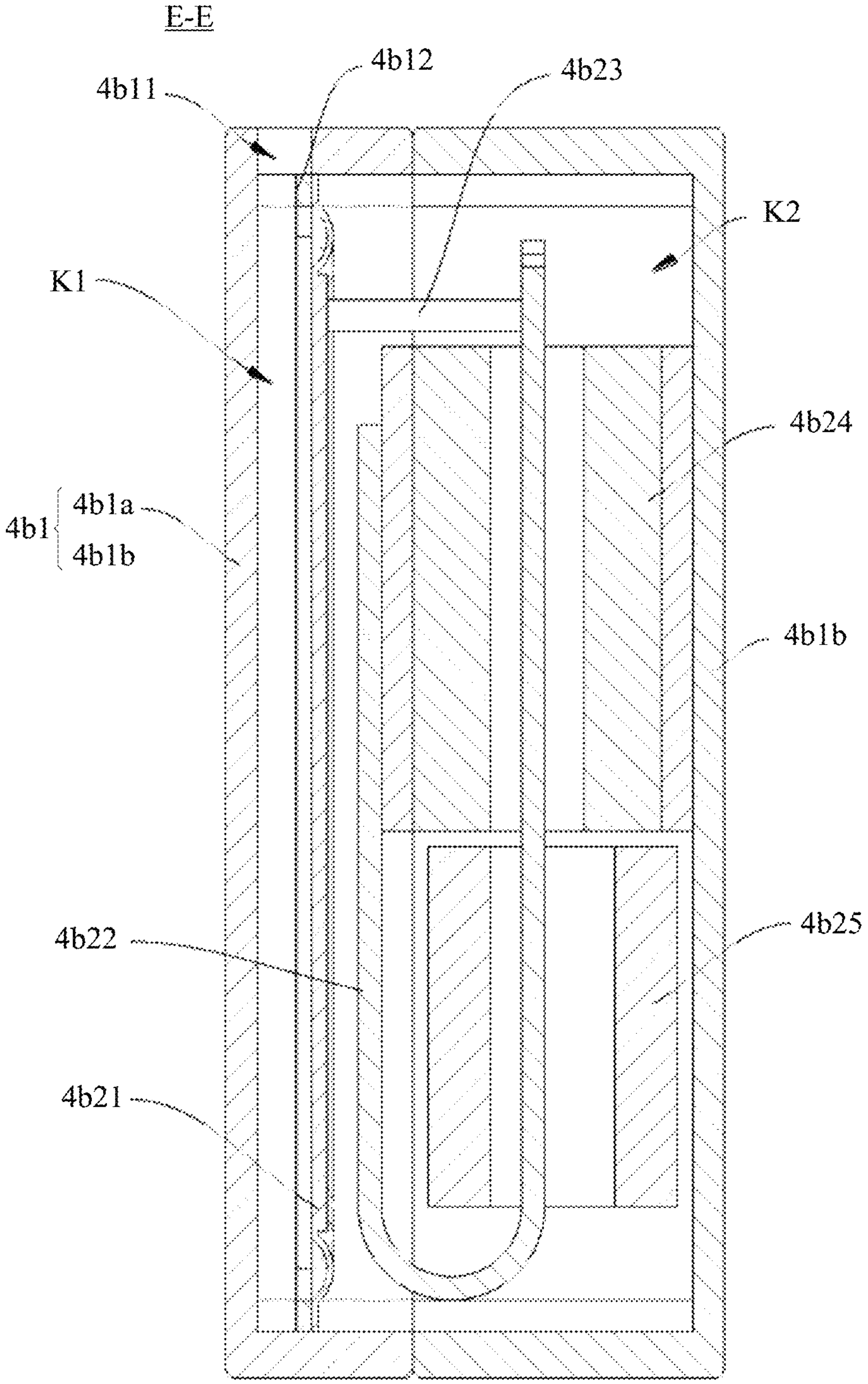
FIG. 22 is a schematic diagram of a structure of a cross section of the second speaker unit shown in FIG. 21 along a line E-E.

Based on the foregoing embodiments, refer to FIG. 21 and FIG. 22. FIG. 21 is a schematic diagram of a structure of the second speaker unit 4b in the headset 100 shown in FIG. 6. FIG. 22 is a schematic diagram of a structure of a cross section of the second speaker unit 4b shown in FIG. 21 along a line E-E. In this embodiment, the second speaker unit 4b may be a moving-iron tweeter. The second speaker unit 4b may include a protective casing 4b1, a second diaphragm assembly 4b21, a spring plate 4b22, a transmission rod 4b23, a second magnetic circuit system 4b24, and a second voice coil 4b25.

It may be understood that FIG. 21, FIG. 22, and the following related accompanying drawings merely show examples of some components included in the second speaker unit 4b. Actual shapes, actual sizes, actual positions, and actual structures of these components are not limited by FIG. 21, FIG. 22, and the following accompanying drawings.

The protective casing 4b1 is configured to protect the second diaphragm assembly 4b21, the spring plate 4b22, the transmission rod 4b23, the second magnetic circuit system 4b24, the second voice coil 4b25, and the like as a carrier of the components in the second speaker unit 4b.

A sound output channel 4b11 is formed on a side that is of the protective casing 4b1 and that is adjacent to the sound output hole 110, and sound of the second speaker unit 4b can be emitted through the sound output channel 4b11, so that both the second speaker unit 4b and the first speaker unit 4a can emit sound toward the sound output hole 110.

A material of the protective casing 4b1 includes but is not limited to metal, plastic, and a combination of metal and plastic. In some embodiments, the material of the protective casing 4b1 is plastic. Plastic has low costs and is easy to form. This helps reduce processing costs of the second speaker unit 4b. In some other examples, to improve structural strength of the protective casing 4b1, the material of the protective casing 4b1 may be metal.

The protective casing 4b1 extends along the sound output direction of the sound output hole 110, that is, a length direction of the protective casing 4b1 is the same as the sound output direction of the sound output hole 110. Specifically, referring to FIG. 21, a shape of the protective casing 4b1 may be a cuboid.

Figure 23:
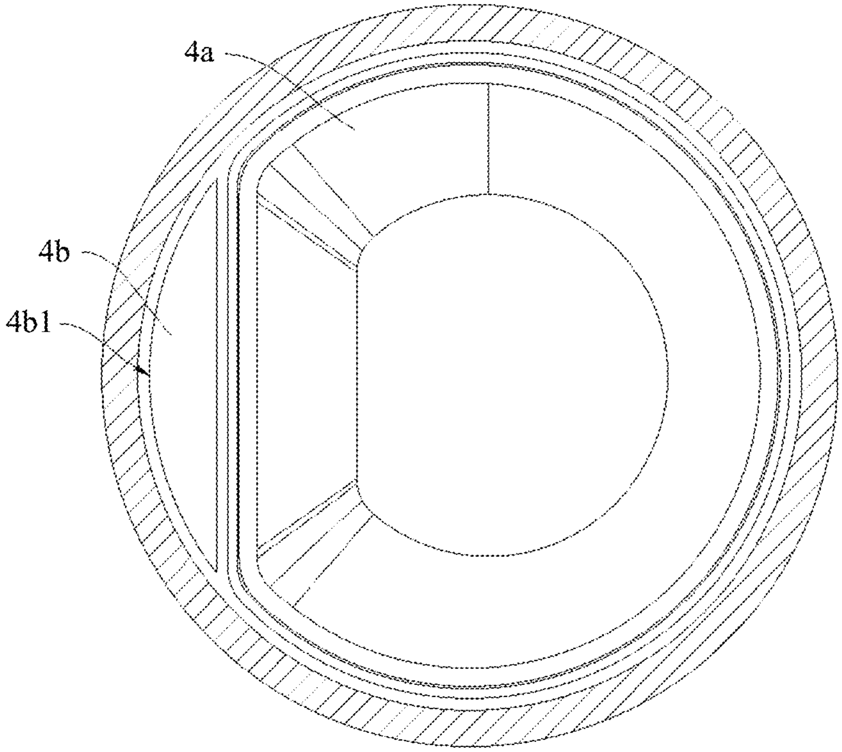
FIG. 23 is a schematic diagram of a partial structure of a headset according to still some other embodiments of this application.

Certainly, this application is not limited thereto. In some other examples, refer to FIG. 23. FIG. 23 is a schematic diagram of a partial structure of the headset 100 according to still some other embodiments of this application. A cross section of the protective casing 4b1 may alternatively be formed as a small semicircle, and a surface that is of the protective casing 4b1 and that faces away from the first speaker unit 4a may be adapted to the first inner circumferential surface region 10a. This disposition helps make full use of the space of the housing 1 to implement compactness of a structure, and facilitates cooperation between the second speaker unit 4b and the first speaker unit 4a to separate the front cavity X1 and the rear cavity X2 of the first speaker unit 4a.

The protective casing 4b1 may be an integral structure, or may be formed by assembling a plurality of parts. In some embodiments, still referring to FIG. 22, the protective casing 4b1 includes a first casing part 4b1a and a second casing part 4b1b. The protective casing 4b1 is formed by assembling the first casing part 4b1a and the second casing part 4b1b. This can facilitate separate processing of the first casing part 4b1a and the second casing part 4b1b, to help simplify mold structures of the first casing part 4b1a and the second casing part 4b1b, thereby reducing forming difficulty of the first casing part 4b1a and the second casing part 4b1b, and reducing processing and manufacturing difficulty of the protective casing 4b1.

Still referring to FIG. 22, the second diaphragm assembly 4b21 is disposed in the protective casing 4b1. The second diaphragm assembly 4b21 is parallel to an axial direction of the first speaker unit 4a. Compared with a solution in which the second diaphragm assembly 4b21 is perpendicular to the axial direction of the first speaker unit 4a, this helps ensure an effective vibration area of the second diaphragm assembly 4b21, and also helps reduce a thickness size of the second speaker unit 4b in a radial direction of the first speaker unit 4a.

The second speaker unit 4b divides space in the protective casing 4b1 into a front cavity k1 and a rear cavity k2 by using the second diaphragm assembly 4b21. In this way, the front cavity k1 and the rear cavity k2 are arranged in the radial direction of the first speaker unit 4a. In some examples, the front cavity k1 is located on a side that is of the rear cavity k2 and that is away from the first speaker unit 4a. This disposition helps reduce sound output interference between the first speaker unit 4a and the second speaker unit 4b. In some other examples, the rear cavity k2 is located on a side that is of the front cavity k1 and that is away from the first speaker unit 4a.

Figure 24:
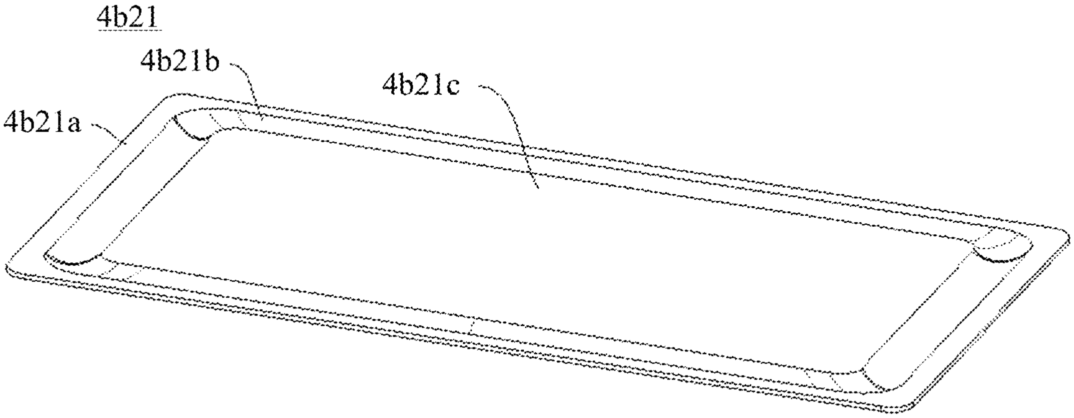
FIG. 24 is a schematic diagram of a structure of a second diaphragm assembly in the second speaker unit shown in FIG. 21.

Refer to FIG. 24. FIG. 24 is a schematic diagram of a structure of the second diaphragm assembly 4b21 of the second speaker unit 4b shown in FIG. 21. The second diaphragm assembly 4b21 includes a second connection part 4b21a, a second folded ring 4b21b, and a second dome 4b21c.

The second connection part 4b21a is in a shape of an annular plate, and the second connection part 4b21a is a rectangular ring with round corners.

Referring to FIG. 24, and referring to FIG. 22, a step part 4b12 is disposed on an inner circumferential surface of the protective casing 4b1, and the second connection part 4b21a is disposed on the step part 4b12 in a stacked manner. A connection relationship between the second connection part 4b21a and the step part 4b12 includes but is not limited to gluing. Certainly, in some other examples, the step part may not be disposed in the protective casing 4_b_1. Instead, the second connection part 4_b_21_a_ is disposed in a shape of an annular cylinder, and the second connection part 4_b_21_a_ is connected to the inner circumferential surface of the protective casing 4_b_1.

The second folded ring 4_b_21_b_ is disposed on the outer circumference of the second dome 4_b_21_c_ and surrounded by the second connection part 4_b_21_a_. The second folded ring 4_b_21_b_ is in a shape of a rectangular ring with round corners. The second folded ring 4_b_21_b_ is recessed toward a side close to the rear cavity K2, to form an arc-shaped or approximately arc-shaped cross section. This disposition can save space of the front cavity K1. Certainly, this application is not limited thereto. In another embodiment, the second folded ring 4_b_21_b_ is recessed toward a side close to the front cavity K1, to form an arc-shaped or approximately arc-shaped cross section.

In some examples, the second diaphragm assembly 4_b_21 may be an integrally formed member. That is, the second connection part 4_b_21_a_, the second folded ring 4_b_21_b_, and the second dome 4_b_21_c_ are integrally formed and connected as a whole. This disposition facilitates simplification of a processing technique and reduction of production costs, and can also improve connection strength between the second connection part 4_b_21_a_ and the second folded ring 4_b_21_b_ and connection strength between the second folded ring 4_b_21_b_ and the second dome 4_b_21_c_. Certainly, this application is not limited thereto. In another embodiment, the second connection part 4_b_21_a_, the second folded ring 4_b_21_b_, and the second dome 4_b_21_c_ may be separately processed and manufactured, and then connected through gluing or the like.

Still referring to FIG. 22, the spring plate 4_b_22 is disposed in the rear cavity K2 of the second speaker unit 4_b_, and is configured to provide a driving force for vibration of the second diaphragm assembly 4_b_21. A material of the spring plate 4_b_22 includes but is not limited to metal.

Figure 25:
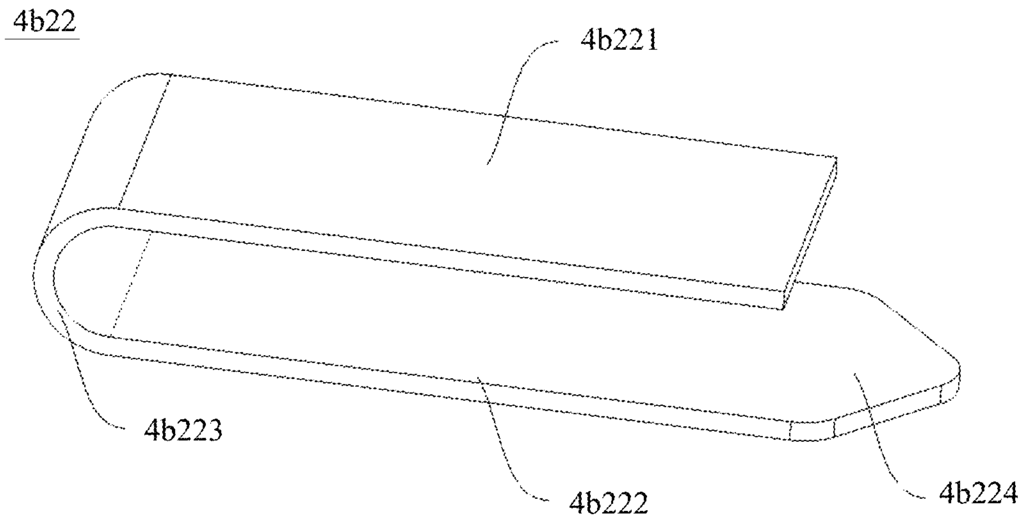
FIG. 25 is a schematic diagram of a structure of a spring plate of the second speaker unit shown in FIG. 21.

Refer to FIG. 25. FIG. 25 is a schematic diagram of a structure of the spring plate 4_b_22 of the second speaker unit 4_b_ shown in FIG. 21. The spring plate 4_b_22 includes a first plate body 4_b_221, a second plate body 4_b_222, and a connection plate body 4_b_223.

The first plate body 4_b_221 is in a shape of a rectangular plate. The first plate body 4_b_221 is disposed in parallel to the second diaphragm assembly 4_b_21. The second plate body 4_b_222 is in a shape of a rectangular plate. The second plate body 4_b_222 is disposed in parallel to the second diaphragm assembly 4_b_21, and the second plate body 4_b_222 is located on a side that is of the first plate body 4_b_221 and that is away from the second diaphragm assembly 4_b_21. A size of the second plate body 4_b_222 may be the same as a size of the first plate body 4_b_221.

A support body 4_b_224 beyond an edge of the first plate body 4_b_221 is disposed at one end of the second plate body 4_b_222, and the support body 4_b_224 is in a shape of a triangle. In some examples, the support body 4_b_224 and the second plate body 4_b_222 may be an integrally formed member, that is, the support body 4_b_224 and the second plate body 4_b_222 are connected as an integral structure. In some other examples, the support body 4_b_224 and the second plate body 4_b_222 may be connected through gluing, clamping, welding, threading, or the like.

A shape of the connection plate body 4_b_223 includes but is not limited to a "C" shape and a "V" shape. The connection plate body 4_b_223 is connected between an end that is of the second plate body 4_b_222 and that is away from the support body 4_b_224 and an end that is of the first plate body 4_b_221 and that is away from the support body 4_b_224.

The spring plate 4_b_22 may be an integrally formed member. That is, the first plate body 4_b_221, the second plate body 4_b_222, and the connection plate body 4_b_223 are connected as a whole. This disposition facilitates simplification of a processing technique and reduction of production costs, and can also improve connection strength between the first plate body 4_b_221 and the connection plate body 4_b_223 and connection strength between the second plate body 4_b_222 and the connection plate body 4_b_223. Certainly, this application is not limited thereto. In another embodiment, the first plate body 4_b_221, the second plate body 4_b_222, and the connection plate body 4_b_223 may be separately processed and manufactured, and then connected through gluing, welding, or the like.

Still referring to FIG. 22, the transmission rod 4_b_23 is in a shape of a rod, the transmission rod 4_b_23 is connected between the support body 4_b_224 and the second dome 4_b_21_c_, and the transmission rod 4_b_23 is perpendicularly disposed with the second plate body 4_b_222. Vibration of the spring plate 4_b_22 may be transmitted to the second diaphragm assembly 4_b_21 through connection of the transmission rod 4_b_23, to cause the second speaker unit 4_b_ to emit sound.

A material of the transmission rod 4_b_23 includes but is not limited to metal or hard plastic. A connection manner between the transmission rod 4_b_23 and the second plate body 4_b_222 includes but is not limited to gluing, welding, clamping, or threading. A connection manner between the transmission rod 4_b_23 and the second diaphragm assembly 4_b_21 includes but is not limited to gluing, welding, clamping, or threading.

Figure 26:
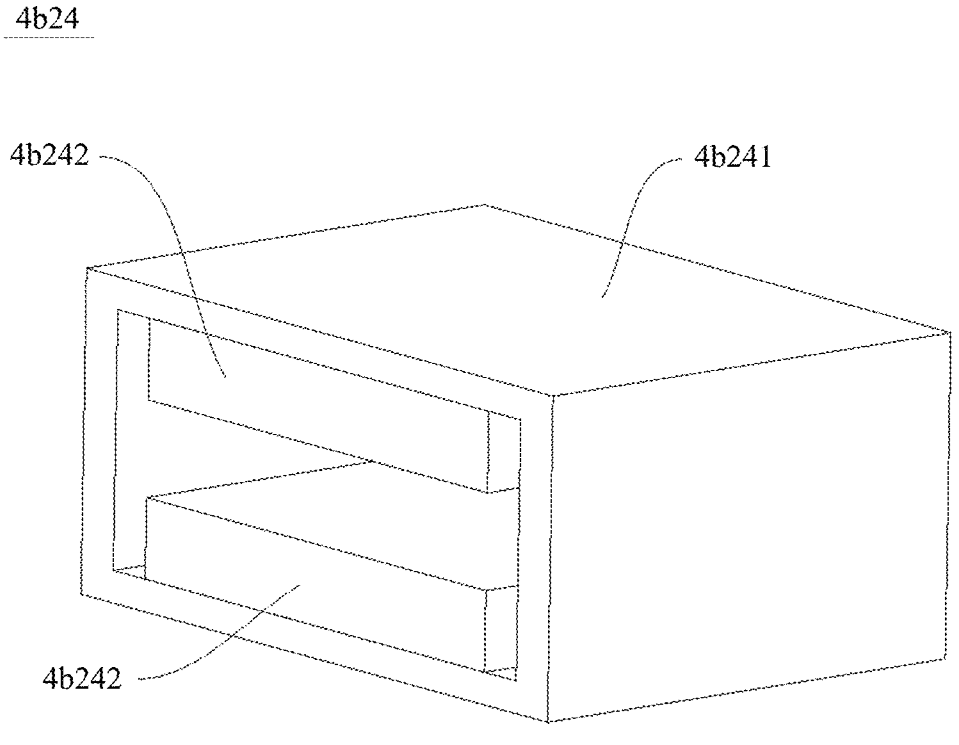
FIG. 26 is a schematic diagram of a structure of a second magnetic circuit system of the second speaker unit shown in FIG. 21.

Refer to FIG. 26, and refer to FIG. 22. FIG. 26 is a schematic diagram of a structure of the second magnetic circuit system 4_b_24 of the second speaker unit 4_b_ shown in FIG. 21. The second magnetic circuit system 4_b_24 is located in the rear cavity K2 of the second speaker unit 4_b_. The second magnetic circuit system 4_b_24 includes a magnetic conductive part 4_b_241 and two magnetic body parts 4_b_242.

The magnetic conductive part 4_b_241 is in a shape of a rectangular ring. An axial direction of the magnetic conductive part 4_b_241 is the same as the axial direction of the first frame 4_a_24. The first plate body 4_b_221 is supported on a surface of a side that is of the magnetic conductive part 4_b_241 and that is adjacent to the second diaphragm assembly 4_b_21. A connection manner between the first plate body 4_b_221 and the magnetic conductive part 4_b_241 includes but is not limited to gluing or clamping.

The two magnetic body parts 4_b_242 are disposed in the magnetic conductive part 4_b_241 and are oppositely disposed in a radial direction of the magnetic conductive part 4_b_241.

A shape of the magnetic body part 4_b_242 includes but is not limited to a cuboid shape, a cylinder shape, or a special shape. Magnetization directions of the two magnetic body parts 4_b_2 are opposite. For example, an end that is of one magnetic body part 4_b_242 and that is close to a central axis of the magnetic conductive part 4_b_241 is an N pole, and an end that is of the magnetic body part 4_b_242 and that is away from the central axis of the magnetic conductive part 4_b_241 is an S pole; and an end that is of the other magnetic body part 4_b_242 and that is close to the central axis of the magnetic conductive part 4_b_241 is an S pole, and an end that is of the magnetic body part 4_b_242 and that is away from the central axis of the magnetic conductive part 4_b_241 is an N pole.

Still referring to FIG. 22, the second plate body **4*b*222 penetrates from one end of the axial direction of the magnetic conductive part 4*b*241 to the other end of the axial direction of the magnetic conductive part 4*b*241, so that the support body 4*b*224 is located outside the magnetic conductive part 4*b*241, and the second plate body 4*b*222 is located between the two magnetic body parts 4*b*242**.

The second voice coil **4*b*25 is located on a side that is of the axial direction of the magnetic conductive part 4*b*241 and that is adjacent to the connection plate body 4*b*223, and the second voice coil 4*b*25 surrounds the outer circumference of the second plate body 4*b*222**.

When the second voice coil **4*b*25 is energized, the second voice coil 4*b*25 may generate a magnetic field, so that the second plate body 4*b*222 located in the second voice coil 4*b*25 is magnetized to generate magnetic poles. In this way, a driving force for driving the second plate body 4*b*222 to vibrate along a spacing direction of the two magnetic body parts 4*b*242 may be formed between the second voice coil 4*b*25 and the magnetic body parts 4*b*242, vibration of the second plate body 4*b*222 can drive the transmission rod 4*b*23 to vibrate, vibration of the transmission rod 4*b*23 further drives the second diaphragm assembly 4*b*21 to vibrate, and vibration of the second diaphragm assembly 4*b*21 can push air in the front cavity K1 to vibrate to generate a sound wave. The sound wave is emitted through the sound output channel 4*b*11**.

In the descriptions of this specification, specific features, structures, materials, or characteristics may be combined in any one or more embodiments or examples in a suitable manner.

Finally, it should be noted that the foregoing embodiments are only used to describe the technical solutions of this application, but are not used to limit this application. Although this application is described in detail with reference to the foregoing embodiments, it should be understood by a person of ordinary skill in the art that the technical solutions described in the foregoing embodiments may still be modified, or some technical features thereof are equivalently replaced. These modifications or replacements do not make the essence of the corresponding technical solutions depart from the spirit and scope of the technical solutions of the embodiments of this application.

What is claimed is:

1. A speaker assembly, used for a headset, wherein the headset comprises a housing, and the speaker assembly comprises:

a first speaker, wherein the first speaker comprises a first diaphragm assembly and an outer circumferential surface, and wherein an outer surface of the first diaphragm assembly faces a first side and a first contour surface of the first speaker is arranged along a circumferential direction of the first speaker, the first contour surface being configured to form a gap between the first contour surface and an inner circumferential surface of the housing; and a second speaker, wherein the second speaker is located within the gap between the first speaker and the inner circumferential surface of the housing on one side of the circumferential direction of the first speaker, the second speaker emits sound toward the first side, and sound emission frequency of the second speaker is greater than sound emission frequency of the first speaker.

2. The speaker assembly according to claim 1, wherein the outer circumferential surface of the first speaker comprises the first contour surface and a second contour surface, and the first contour surface and the second contour surface are arranged and connected along the circumferential direction of the first speaker;

the inner circumferential surface of the housing comprises a first inner circumferential surface region and a second inner circumferential surface region, and the first inner circumferential surface region and the second inner circumferential surface region are arranged and connected along a circumferential direction of the housing; and the first contour surface is opposite to and spaced apart from the first inner circumferential surface region, the second contour surface is adapted to the second inner circumferential surface region, and the second speaker is located between the first contour surface and the first inner circumferential surface region.

3. The speaker assembly according to claim 2, wherein both the second inner circumferential surface region and the second contour surface are arc-shaped surfaces that extend along the circumferential direction of the housing and that are arched away from the first contour surface.

4. The speaker assembly according to claim 3, wherein the first contour surface is a plane, or the first contour surface is an arc-shaped surface arched toward the first inner circumferential surface region.

5. The speaker assembly according to claim 2, wherein the first speaker comprises a first frame, the first diaphragm assembly is supported on the first frame and disposed based on a same central axis as the first frame, a circumferential wall of the first frame comprises a first part and a second part, the first part and the second part are arranged and connected along a circumferential direction of the first frame, a surface that is of the first part and that faces away from the second part is formed as the first contour surface, and a surface that is of the second part and that faces away from the first part is formed as the second contour surface.

6. The speaker assembly according to claim 5, wherein the first diaphragm assembly has a first folded ring, the first folded ring comprises a first segment and a second segment, the first segment and the second segment are arranged and connected in the circumferential direction of the first frame, an extending path of the first segment along the circumferential direction of the first frame is the same as an extending path of the first part along the circumferential direction of the first frame, an extending path of the second segment along the circumferential direction of the first frame is the same as an extending path of the second part along the circumferential direction of the first frame, the first segment is located between the first part and the second segment, and the second segment is located between the first segment and the second part.

7. The speaker assembly according to claim 6, wherein the first segment is equal to the second segment in width.

8. The speaker assembly according to claim 5, wherein an annular groove recessed in a direction away from the central axis of the first frame is disposed on an inner circumferential surface of the first frame, the annular groove extends along the circumferential direction of the first frame and the annular groove penetrates to an end surface of an open end of the first frame, and an outer edge of the first diaphragm assembly is accommodated in the annular groove and fastened to a bottom surface of the annular groove.

9. The speaker assembly according to claim 5, wherein the first speaker comprises a first voice coil, and the first voice coil is connected to an inner surface of the first diaphragm assembly; and the first voice coil comprises a first voice coil part and a second voice coil part that are arranged and connected in the circumferential direction of the first frame, an extending path of the first voice coil part along the circumferential direction of the first frame is the same as the extending path of the first part along the circumferential direction of the first frame, the first voice coil part is located between the first part and the second voice coil part, an extending path of the second voice coil part along the circumferential direction of the first frame is the same as the extending path of the second part along the circumferential direction of the first frame, and the second voice coil part is located between the second part and the first voice coil part.

10. The speaker assembly according to claim 9, wherein the first speaker comprises a first magnetic circuit system, the first magnetic circuit system is fastened to the first frame, and the first magnetic circuit system has an annular magnetic gap; and the magnetic gap comprises a first gap part and a second gap part, the first gap part and the second gap part are arranged and connected in the circumferential direction of the first frame, the first gap part is adapted to the first voice coil part, and the second gap part is adapted to the second voice coil part.

11. The speaker assembly according to claim 10, wherein a width of the first gap part is less than a width of the second gap part.

12. The speaker assembly according to claim 2, wherein a surface that is of the second speaker and that faces away from the first speaker is adapted to the first inner circumferential surface region.

13. The speaker assembly according to claim 1, wherein an outer circumferential contour of the first speaker is elliptical, and the second speaker is located at one end of a length direction of a short axis of the first speaker.

14. The speaker assembly according to claim 1, wherein the first speaker is a moving-coil woofer.

15. The speaker assembly according to claim 1, wherein the second speaker is a moving-iron tweeter or a planar voice coil tweeter.

16. A headset, comprising:

a housing, wherein a sound output hole is formed on the housing; and a speaker assembly, wherein the speaker assembly comprises:

a first speaker, wherein the first speaker comprises a first diaphragm assembly and an outer circumferential surface, and an outer surface of the first diaphragm assembly faces a first side and a first contour surface of the first speaker is arranged along a circumferential direction of the first speaker, the first contour surface being configured to form a gap between the first contour surface and an inner circumferential surface of the housing, and a second speaker, wherein the second speaker is located within the gap between the first speaker and the inner circumferential surface of the housing on one side of a circumferential direction of the first speaker, the second speaker emits sound toward the first side, and sound emission frequency of the second speaker is greater than sound emission frequency of the first speaker, wherein the first speaker is disposed in the housing, the outer surface of the first diaphragm assembly faces the sound output hole, the second speaker is disposed in the housing, and the second speaker emits sound toward the sound output hole.

17. The headset according to claim 16, wherein the outer circumferential surface of the first speaker comprises the first contour surface and a second contour surface, and the first contour surface and the second contour surface are arranged and connected along the circumferential direction of the first speaker;

the inner circumferential surface of the housing comprises a first inner circumferential surface region and a second inner circumferential surface region, and the first inner circumferential surface region and the second inner circumferential surface region are arranged and connected along a circumferential direction of the housing; and the first contour surface is opposite to and spaced apart from the first inner circumferential surface region, the second contour surface is adapted to the second inner circumferential surface region, and the second speaker is located between the first contour surface and the first inner circumferential surface region.

18. The headset according to claim 17, wherein both the second inner circumferential surface region and the second contour surface are arc-shaped surfaces that extend along the circumferential direction of the housing and that are arched away from the first contour surface.

19. The headset according to claim 18, wherein the first contour surface is a plane, or the first contour surface is an arc-shaped surface arched toward the first inner circumferential surface region.

20. The headset according to claim 17, wherein the first speaker comprises a first frame, the first diaphragm assembly is supported on the first frame and disposed based on a same central axis as the first frame, a circumferential wall of the first frame comprises a first part and a second part, the first part and the second part are arranged and connected along a circumferential direction of the first frame, a surface that is of the first part and that faces away from the second part is formed as the first contour surface, and a surface that is of the second part and that faces away from the first part is formed as the second contour surface.

* * * * *